US012750491B2

(12) United States Patent
Lee et al.

(10) Patent No.: US 12,750,491 B2
(45) Date of Patent: Sep. 29, 2026

(54) IMAGE ENCODING/DECODING METHOD AND DEVICE, AND RECORDING MEDIUM STORING BITSTREAM

(71) Applicant: Electronics and Telecommunications Research Institute, Daejeon (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 25 days.

(21) Appl. No.: 18/916,567

(22) Filed: Oct. 15, 2024

(65) Prior Publication Data

US 2025/0039399 A1 Jan. 30, 2025

Related U.S. Application Data

(63) Continuation of application No. 18/499,795, filed on Nov. 1, 2023, now Pat. No. 12,137,229, which is a (Continued)

(30) Foreign Application Priority Data

Sep. 20, 2018 (KR) ........................ 10-2018-0113033
Sep. 28, 2018 (KR) ........................ 10-2018-0115917

(Continued)

(51) Int. Cl.
*H04N 19/139* (2014.01)
*H04N 19/159* (2014.01)

(Continued)

(52) U.S. Cl.
CPC ......... *H04N 19/139* (2014.11); *H04N 19/159* (2014.11); *H04N 19/167* (2014.11); *H04N 19/176* (2014.11); *H04N 19/593* (2014.11)

(58) Field of Classification Search
CPC .. H04N 19/139; H04N 19/159; H04N 19/167; H04N 19/176; H04N 19/593

(Continued)

(56) References Cited

U.S. PATENT DOCUMENTS

2015/0016542 A1* 1/2015 Rosewarne .......... H04N 19/126 375/240.25
2017/0289566 A1 10/2017 He et al.

FOREIGN PATENT DOCUMENTS

CN 107005708 A 8/2017
CN 108141604 A 6/2018

(Continued)

OTHER PUBLICATIONS

Haitao Yang et al., Description of Core Experiment 4 (CE4): Inter prediction and motion vector coding, Document: JVET-K1024-v2, Joint Video Experts Team (JVET) of ITU-T SG 16 WP 3 and ISO/IEC JTC 1/SC 29/WG 11, 11th Meeting: Ljubljana, SI, Jul. 10-18, 2018.

(Continued)

*Primary Examiner* — Nguyen T Truong
(74) *Attorney, Agent, or Firm* — BROADVIEW IP LAW, PC

(57) ABSTRACT

An image decoding method is disclosed in the present specification. An image decoding method according to the present invention may include: determining a position of a co-located block of a current block within a co-located picture (co-located picture); determining a representative motion vector of the current block by using motion information at the position of the co-located block; and deriving (Continued)

motion information on a sub-block included in the current block by using the representative motion vector.

12 Claims, 21 Drawing Sheets

Related U.S. Application Data continuation of application No. 17/994,261, filed on Nov. 25, 2022, now Pat. No. 11,871,001, which is a continuation of application No. 17/277,664, filed as application No. PCT/KR2019/012277 on Sep. 20, 2019, now Pat. No. 11,546,605.

(30) Foreign Application Priority Data

| | | |
|---|---|---|
| Oct. 8, 2018 | (KR) | 10-2018-0119528 |
| Dec. 26, 2018 | (KR) | 10-2018-0169000 |
| Jan. 3, 2019 | (KR) | 10-2019-0000555 |
| Jun. 13, 2019 | (KR) | 10-2019-0069693 |

(51) Int. Cl.
*H04N 19/167* (2014.01)
*H04N 19/176* (2014.01)
*H04N 19/593* (2014.01)

(58) Field of Classification Search
USPC .................................................... 375/240.16
See application file for complete search history.

(56) References Cited

FOREIGN PATENT DOCUMENTS

| | | | |
|---|---|---|---|
| KR | 100772576 | B1 | 11/2007 |
| KR | 10-2010-0046732 | A | 5/2010 |
| KR | 1020140051342 | A | 4/2014 |
| WO | 2001086962 | A1 | 11/2001 |
| WO | 2015152608 | A2 | 10/2015 |
| WO | 2017003063 | A1 | 1/2017 |
| WO | 2019137750 | A1 | 7/2019 |

OTHER PUBLICATIONS

Haitao Yang et al., Description of Core Experiment 4 (CE4): Inter prediction and motion vector coding, Joint Video Experts Team (JVET) of ITU-T SG 16 WP 3 and ISO/IEC JTC 1/SC 29/WG 11, JVET-K1024-v4, 11th Meeting: Ljubljana, SI, Jul. 10-18, 2018, CE coordinators.

Jianle Chen et al., Algorithm description for Versatile Video Coding and Test Model 2 (VTM 2), Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018.

Jianle Chen et al., Algorithm Description of Joint Exploration Test Model 7 (JEM 7), Joint Video Exploration Team (JVET) of ITU-T SG 16 WP 3 and ISO/IEC JTC 1/SC 29/WG 11, Document: JVET-G1001-v1, 7th Meeting, Jul. 13-21, 2017, pp. 1-44, Torino, IT.

Jianle Chen et. al., Algorithm description for Versatile Video Coding and Test Model 2 (VTM 2), Joint Video Experts Team (JVET) of ITU-T SG 16 WP3 and ISO/IEC JTC 1/SC 29/WG 11, Document: JVET-K1002-v2, 11th Meeting, Jul. 10-18, 2018, pp. 1-21, Ljubljana, SI.

Moonmo Koo et. al., Description of SDR video coding technology proposal by LG Electronics, Joint Video Experts Team (JVET) of ITU-T SG 16 WP3 and ISO/IEC JTC 1/SC 29/WG 11, Document: JVET-J0017-v1, 10th Meeting, Apr. 10-20, 2018, pp. 1-67, San Diego, CA.

* cited by examiner (a) (b)

FIG.11

| when MaxNumMergeCand is 7 | | | | | | | | | | | | | |
|---|---|---|---|---|---|---|---|---|---|---|---|---|---|
| merge candidate index (merge-idx) | L0 motion information | | | L1 motion information | | | L2 motion information | | | L3 motion information | | | description |
| | motion vector | referen ce image index | predicti on list utilizati on flag | motion vector | referen ce image index | predicti on list utilizati on flag | motion vector | referen ce image index | predicti on list utilizati on flag | motion vector | referen ce image index | predicti on list utilizati on flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| ... | | | | | | | | | | | | | |
| numMergeCand = 4 | | | | | | | | | | | | | |

FIG.13

| when MaxNumMergeCand is 7 | | | | | | | | | | | | | description |
|---|---|---|---|---|---|---|---|---|---|---|---|---|---|
| merge candidate index (merge-idx) | L0 motion information | | | L1 motion information | | | L2 motion information | | | L3 motion information | | | |
| | motion vector | reference image index | prediction list utilization flag | motion vector | reference image index | prediction list utilization flag | motion vector | reference image index | prediction list utilization flag | motion vector | reference image index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| ... | | | | | | | | | | | | | |
| numMergeCand = 5 | | | | | | | | | | | | | |

FIG.15

| combined index (combIdx) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| L0 candidate index(l0CandIdx) | 0 | 1 | 1 | 1 | 0 | 2 | 2 | 2 | 0 | 3 | 3 | 3 | 0 | 4 | 4 | 4 |
| L1 candidate index(l1CandIdx) | 1 | 0 | 1 | 1 | 2 | 0 | 2 | 2 | 3 | 0 | 3 | 3 | 4 | 0 | 4 | 4 |
| L2 candidate index(l2CandIdx) | 1 | 1 | 0 | 1 | 2 | 2 | 0 | 2 | 3 | 3 | 0 | 3 | 4 | 4 | 0 | 4 |
| L3 candidate index(l3CandIdx) | 1 | 1 | 1 | 0 | 2 | 2 | 2 | 0 | 3 | 3 | 3 | 0 | 4 | 4 | 4 | 0 |

FIG.16

| When MaxNumMergeCand is 7 | | | | | | | | | | | | | |
|---|---|---|---|---|---|---|---|---|---|---|---|---|---|
| merge candidate index (merge_idx) | L0 motion information | | | L1 motion information | | | L2 motion information | | | L3 motion information | | | description |
| | motion vector | reference image index | prediction list utilization flag | motion vector | reference image index | prediction list utilization flag | motion vector | reference image index | prediction list utilization flag | motion vector | reference image index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| 5 | (3, 1) | 0 | 1 | (-3, 0) | 0 | 1 | (-7, 5) | 1 | 1 | - | - | 0 | combined merge candidate #1 |
| 6 | (-1, 5) | 1 | 1 | (-2, 0) | 0 | 1 | (-7, 5) | 1 | 1 | - | - | 0 | combined merge candidate #2 |
| numMergeCand = 7 | | | | | | | | | | | | | |

FIG.18

| When MaxNumMergeCand is 7 | | | | | | | | | | | | | |
|---|---|---|---|---|---|---|---|---|---|---|---|---|---|
| merge candidate index (merge_idx) | L0 motion information | | | L1 motion information | | | L2 motion information | | | L3 motion information | | | description |
| | motion vector | reference image index | prediction list utilization flag | motion vector | reference image index | prediction list utilization flag | motion vector | reference image index | prediction list utilization flag | motion vector | reference image index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| 5 | (3, 1) | 0 | 1 | (-3, 0) | 0 | 1 | (-7, 5) | 1 | 1 | - | - | 0 | combined merge candidate #1 |
| 6 | (-1, 5) | 1 | 1 | (-2, 0) | 0 | 1 | (-7, 5) | 1 | 1 | - | - | 0 | combined merge candidate #2 |
| 7 | (0, 0) | 0 | 1 | (0, 0) | 0 | 1 | (0, 0) | 0 | 1 | (0, 0) | 0 | 1 | zero merge candidate |
| numMergeCand = 5 | | | | | | | | | | | | | |

IMAGE ENCODING/DECODING METHOD AND DEVICE, AND RECORDING MEDIUM STORING BITSTREAM

CROSS-REFERENCE TO RELATED APPLICATIONS

The present application is a continuation application of U.S. application Ser. No. 18/499,795, filed on Nov. 1, 2023, which is a continuation application of U.S. application Ser. No. 17/994,261, filed on Nov. 25, 2022, granted U.S. Pat. No. 11,871,001, issued on Jan. 9, 2024, which is a continuation application of U.S. application Ser. No. 17/277,664, filed on Mar. 18, 2021, granted U.S. Pat. No. 11,546,605, issued on Jan. 3, 2023, which was the National Stage of International Application No. PCT/KR2019/012277, filed on Sep. 20, 2019, which claims priority under 35 U.S.C. § 119 (a) to Korean Patent Applications: KR10-2018-0113033, filed on Sep. 20, 2018, KR10-2018-0115917, filed on Sep. 28, 2018, KR10-2018-0119528, filed on Oct. 8, 2018, KR10-2018-0169000, filed on Dec. 26, 2018, KR10-2019-0000555, filed on Jan. 3, 2019, KR10-2019-0069693, filed on Jun. 13, 2019, with the Korean Intellectual Property Office, which are incorporated herein by reference in their entirety.

TECHNICAL FIELD

The present invention relates to a method and an apparatus for encoding/decoding an image, and a recording medium for storing a bitstream. More particularly, the present invention relates to a method and an apparatus for encoding/decoding an image on the basis of a sub-block based motion information, and a recording medium for storing a bitstream.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

DISCLOSURE

Technical Problem

An objective of the present invention is to provide an image encoding/decoding method and apparatus capable of improving compression efficiency, and a recording medium in which a bitstream generated by the method or apparatus is stored.

Another objective of the present invention is to provide an image encoding/decoding method and apparatus capable of improving compression efficiency by deriving a subblock-based motion information and a recording medium in which a bitstream generated by the method or apparatus is stored.

Technical Solution

According to the present invention, image decoding method comprises determining a position of a co-located block of a current block within a co-located picture, determining a representative motion vector of the current block by using motion information at the position of the co-located block and deriving motion information on a sub-block included in the current block by using the representative motion vector.

wherein the determining of the position of the co-located block includes: deriving a temporal motion vector used for determining the position of the co-located block.

wherein the temporal motion vector is derived by using motion information of a neighbor block adjacent to the current block.

wherein the adjacent neighbor block is a left neighbor block of the current block.

wherein when the motion information of the adjacent neighbor block is not usable, the temporal motion vector is derived as a zero motion vector.

wherein the determining of the position of the co-located block includes determining whether or not a reference picture of the adjacent neighbor block and a co-located picture are identical when the motion information of the adjacent neighbor block is usable and when the reference pictures of the adjacent neighbor block and the co-located picture are identical, determining a motion vector of the adjacent neighbor block as the temporal motion vector.

wherein the position of the co-located block is determined as a position calculated by moving by the temporal motion vector from a position within the co-located picture associated with a center position of the current block.

wherein in deriving the motion information of the sub-block, whether or not to derive the motion information of the sub-block is determined according to whether or not motion information at the position of the co-located block is usable.

wherein when a prediction mode at the position of the co-located block is one of an intra-prediction mode and a prediction mode referring to a current picture, it is determined that the motion information at the position of the co-located block is not usable.

wherein the representative motion vector is derived on the basis of the motion information at the position of the co-located block.

wherein when L0 motion information is usable from L0 and L1 motion information at the position of the co-located block, an L1 representative motion vector of the current block is derived on the basis of the L0 motion information.

wherein when L1 motion information is usable from L0 and L1 motion information at the position of the co-located block, an L0 representative motion vector of the current block is derived on the basis of the L1 motion information.

wherein the current block refers to a first reference picture within an L0 or L1 reference picture list.

wherein a width and a height of the sub-block are preset.

wherein whether or not to perform deriving the motion information on a plurality of sub-blocks is determined on the basis of a size of the current block.

wherein when a width of the current block is smaller than 8 or a height of the current block is smaller than 8, deriving the motion information on the plurality of sub-blocks is not performed.

wherein the motion information of the sub-block is derived by using motion information at a position calculated by moving by the temporal motion vector from a position within the co-located picture which is associated with a position of the sub-block.

wherein when motion information at a position calculated by moving by the temporal motion vector from a position within the co-located picture which is associated with a position of the sub-block is not usable, the motion information of the sub-block is determined as representative motion information of the current block.

According to the present invention, a method of encoding an image, wherein the method comprises determining a position of a co-located block of a current block within a co-located picture, determining a representative motion vector of the current block by using motion information at the position of the co-located block and deriving motion information on a sub-block included in the current block by using the representative motion vector.

According to the present invention, a computer readable recording medium storing a bitstream that is received in an image decoding apparatus, and used for reconstructing a current block included in a current picture, wherein the bitstream includes information on a neighbor block adjacent to the current block, the information on the neighbor block is used for determining a position of a co-located block of the current block within a co-located picture, motion information at the position of the co-located block is used for determining a representative motion vector of the current block, and motion information on a sub-block included in the current block is derived by using the representative motion vector.

Advantageous Effects

According to the present invention, it is possible to provide an image encoding/decoding method and apparatus capable of improving compression efficiency and to provide a recording medium in which a bitstream generated by the method or apparatus is stored.

In addition, according to the present invention, it is possible to provide an image encoding/decoding method and apparatus capable of improving compression efficiency by using derivation of subblock-based motion information and a recording medium in which a bitstream generated by the method or apparatus is stored.

DESCRIPTION OF DRAWINGS

FIG. 11 is a view showing a method of deriving a merge candidate list by using a spatial merge candidate.

FIG. 13 is a view showing a method of deriving a merge candidate list by using a temporal merge candidate.

FIG. 15 is a view showing a method of deriving a combined merge candidate according to an embodiment of the present invention.

FIG. 16 is a view showing a method of deriving a merge candidate list by using a combined merge candidate.

FIG. 18 is a view showing a method of deriving a merge candidate list by using a zero merge candidate.

MODE FOR INVENTION

Figure 1:
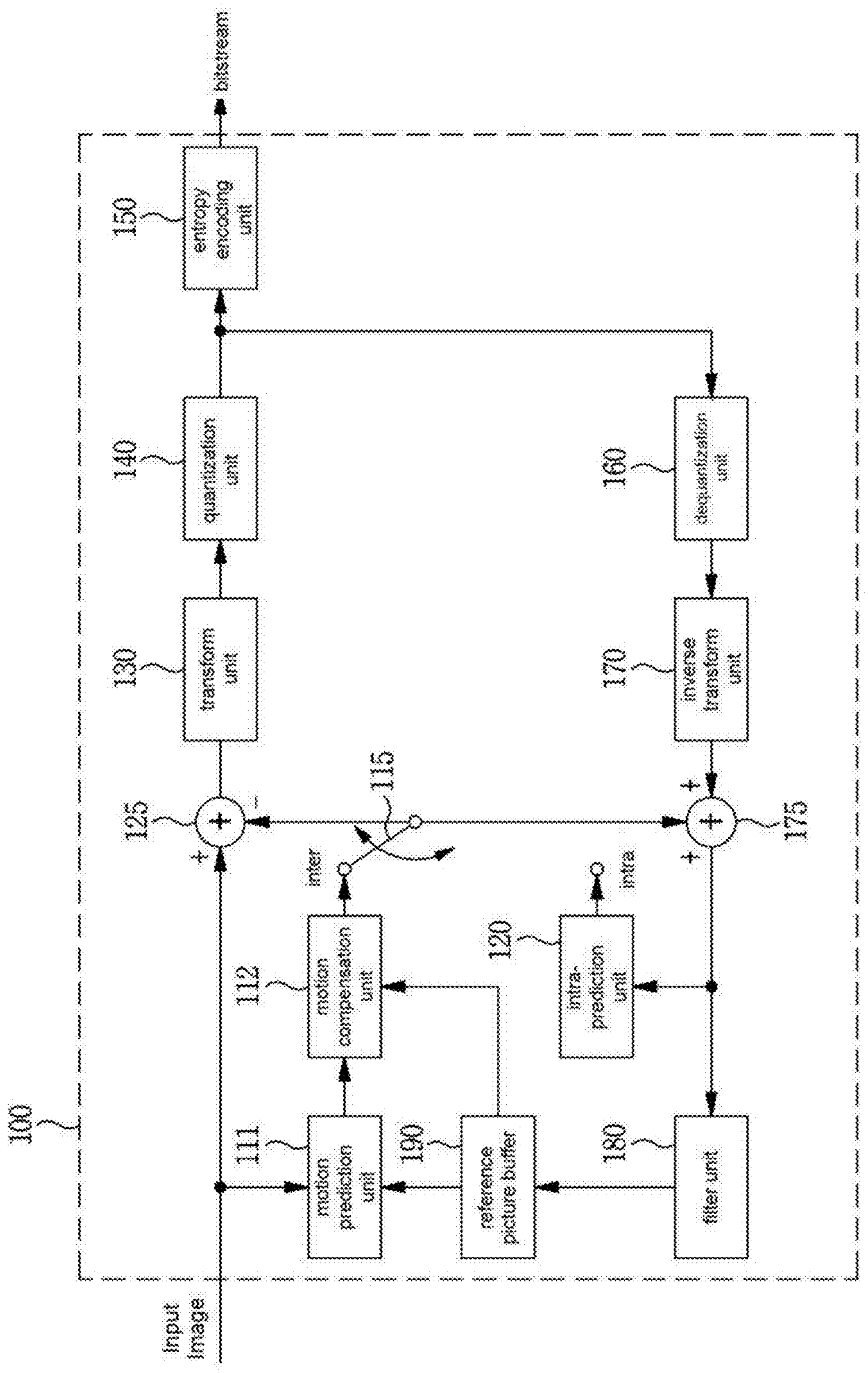
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, ‘first’, ‘second’, etc. can be used to describe various components, but the components are not to be construed as being limited to the terms. The terms are only used to differentiate one component from other components. For example, the ‘first’ component may be named the ‘second’ component without departing from the scope of the present invention, and the ‘second’ component may also be similarly named the ‘first’ component. The term ‘and/or’ includes a combination of a plurality of items or any one of a plurality of terms.

It will be understood that when an element is simply referred to as being ‘connected to’ or ‘coupled to’ another element without being ‘directly connected to’ or ‘directly coupled to’ another element in the present description, it may be ‘directly connected to’ or ‘directly coupled to’ another element or be connected to or coupled to another element, having the other element intervening therebetween. In contrast, it should be understood that when an element is referred to as being “directly coupled” or “directly connected” to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as “including”, “having”, etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being “included”, elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, “encoding or decoding or both of an image” may mean “encoding or decoding or both of a moving picture”, and may mean “encoding or decoding or both of one image among images of a moving picture.”

Hereinafter, terms “moving picture” and “video” may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms “image”, “picture, “frame” and “screen” may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms “target block” and “current block” may be used as the same meaning and be replaced with each other.

Hereinafter, terms “block” and “unit” may be used as the same meaning and be replaced with each other. Or a “block” may represent a specific unit.

Hereinafter, terms “region” and “segment” may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to “0” may represent a logical false or the first predefined value. In other words, a value “0”, a false, a logical false and the first predefined value may be replaced with each other. A value of information, data, flag, index, element and attribute equal to “1” may represent a logical true or the second predefined value. In other words, a value “1”, a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

The adaptation parameter set refers to a parameter set that can be shared and referred to by different pictures, subpictures, slices, tile groups, tiles, or bricks. In addition, sub-pictures, slices, tile groups, tiles, or bricks in a picture may refer to different adaptation parameter sets to use information in the different adaptation parameter sets.

Regarding the adaptation parameter sets, sub-pictures, slices, tile groups, tiles, or bricks in a picture may refer to different adaptation parameter sets by using identifiers of the respective adaptation parameter sets.

Regarding the adaptation parameter sets, slices, tile groups, tiles, or bricks in a sub-picture may refer to different adaptation parameter sets by using identifiers of the respective adaptation parameter sets.

Regarding the adaptation parameter sets, tiles or bricks in a slice may refer to different adaptation parameter sets by using identifiers of the respective adaptation parameter sets.

Regarding the adaptation parameter sets, bricks in a tile may refer to different adaptation parameter sets by using identifiers of the respective adaptation parameter sets.

The parameter set or header of a sub-picture may include information on an adaptation parameter set identifier. Thus, an adaptation parameter set corresponding to the adaptation parameter set identifier may be used in the sub-picture.

The parameter set or header of a tile may include an adaption parameter set identifier so that an adaption parameter set corresponding to the adaption parameter set identifier may be used in the tile.

The header of a brick may include information on an adaptation parameter set identifier so that an adaptation parameter set corresponding to the adaptation parameter set identifier may be used in the brick.

The picture may be split into one or more tile rows and one or more tile columns.

The sub-picture in a picture may be split into one or more tile rows and one or more tile columns. The sub-picture may be a rectangular or square region in a picture and may include one or more CTUs. The sub-picture may include at least one tile, brick, and/or slice.

The tile may be a rectangular or square region in a picture and may include one or more CTUs. The tile may be split into one or more bricks.

The brick may refer to one or more CTU rows in a tile. The tile may be split into one or more bricks, and each brick may have at least one CTU row. A tile that is not split into two or more bricks may also mean a brick.

The slice may include one or more tiles in a picture and may include one or more bricks in a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
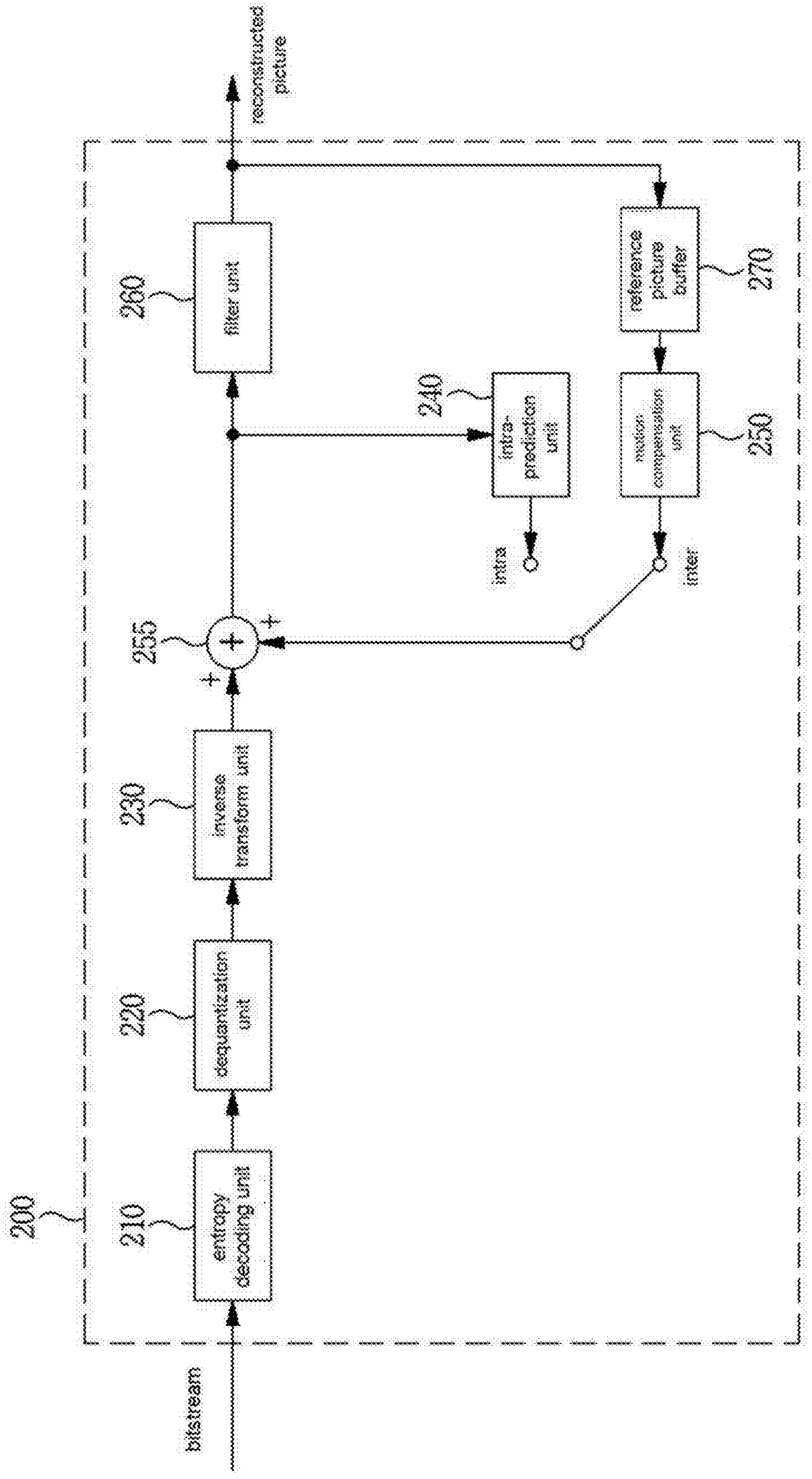
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
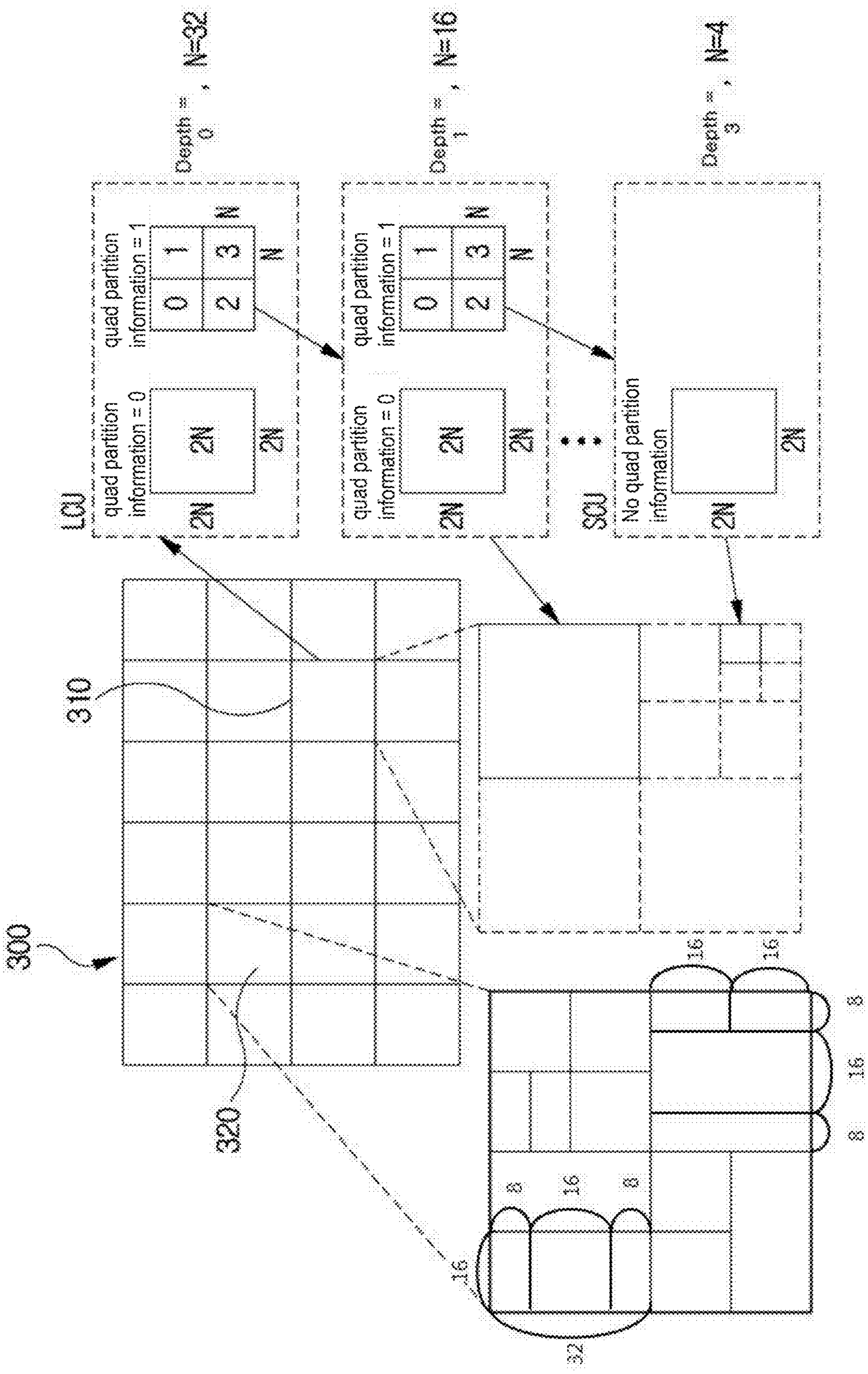
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
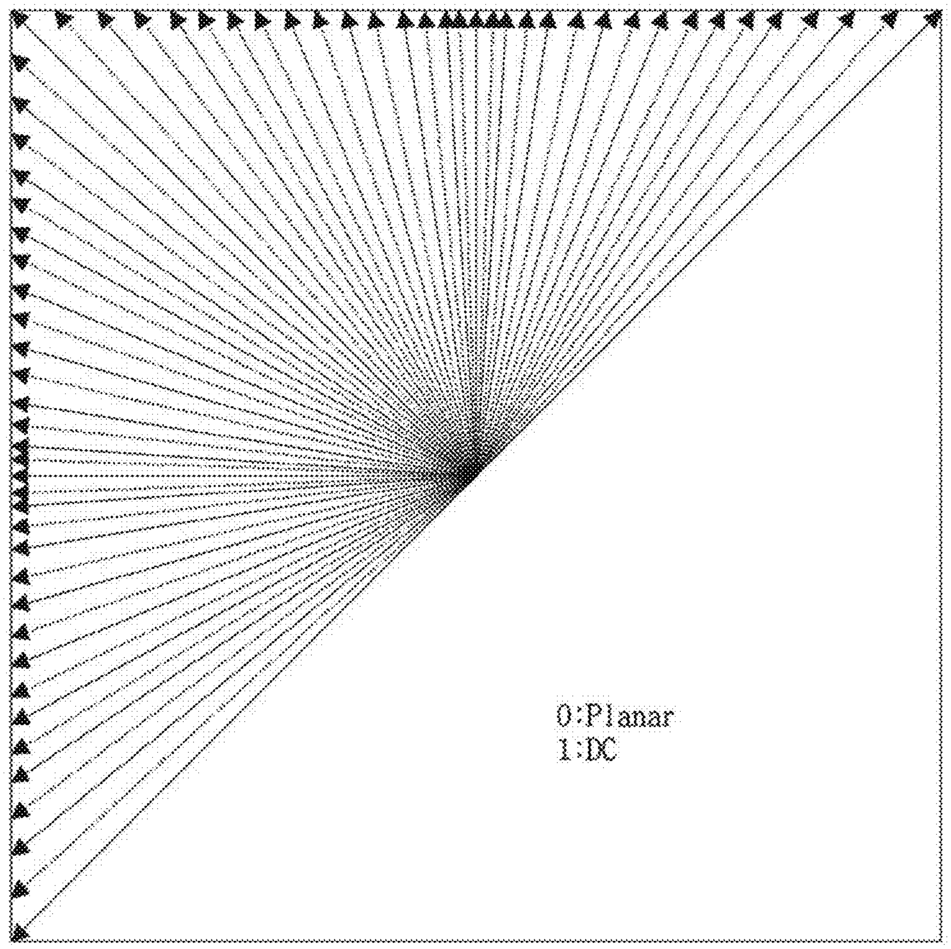
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
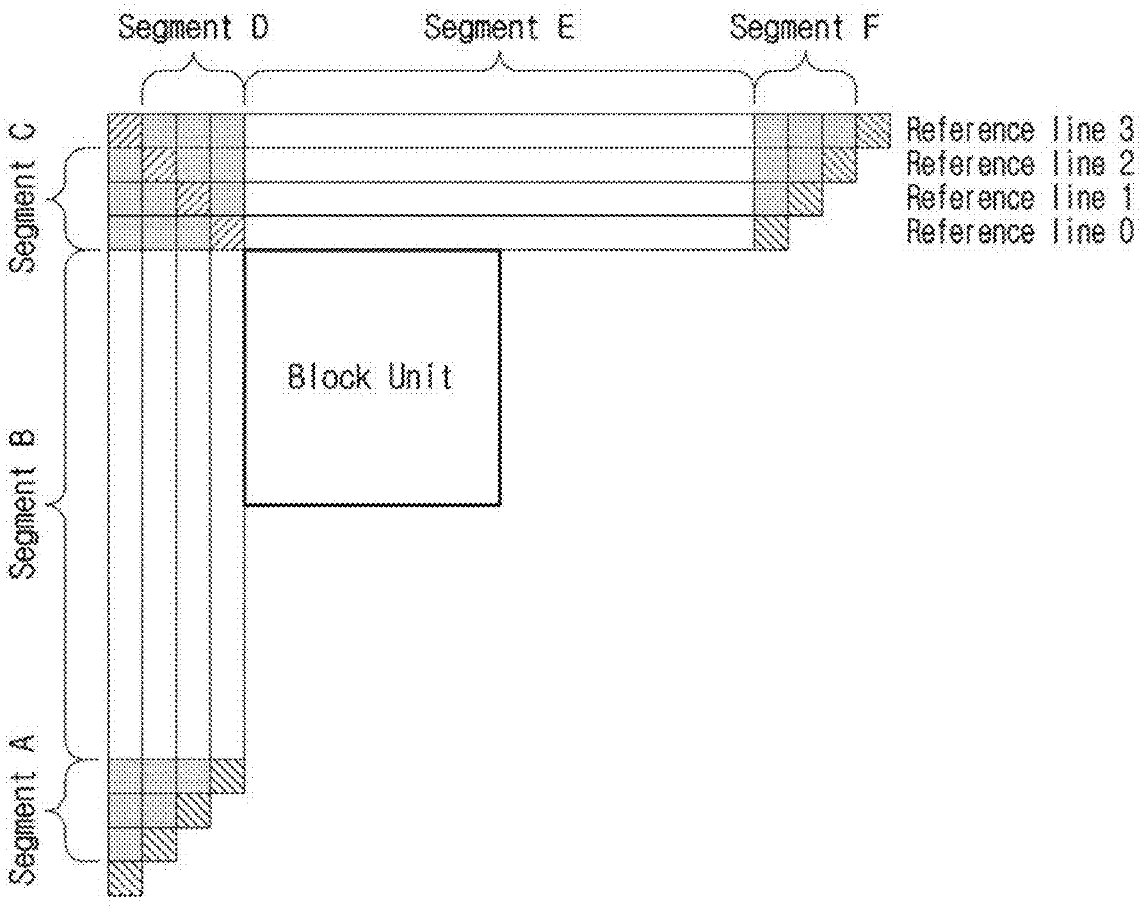
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
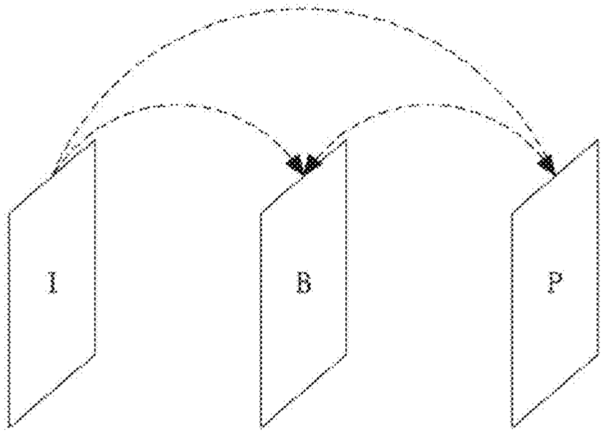
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
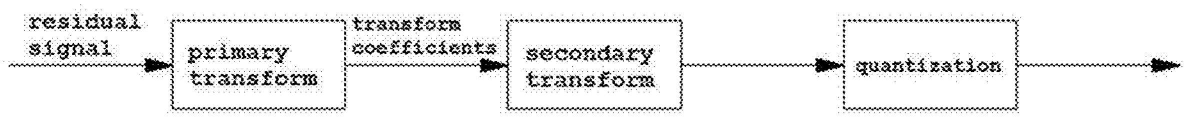
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a method of encoding/decoding an image by using a merge candidate list according to an embodiment of the present invention will be described in detail.

An image may be encoded/decoded according to at least one of examples below or combination thereof. Encoding efficiency of the image encoder and decoding efficiency of the image decoder can be improved by efficiently determining a reference block of a current block by using examples below when encoding/decoding an image.

Figure 8:
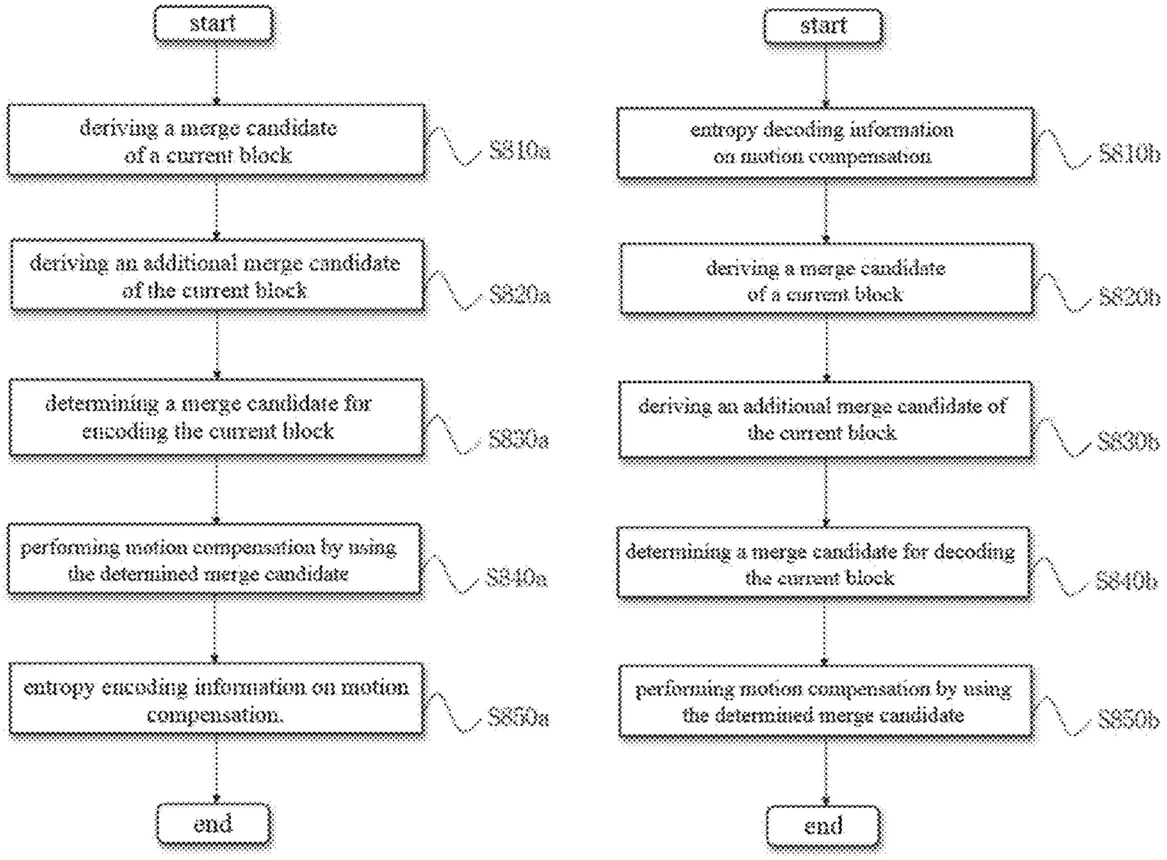
FIGS. 8 and 9 are views respectively showing a method of performing encoding or decoding by using a merge candidate list according to an embodiment of the present invention.
Figure 9:
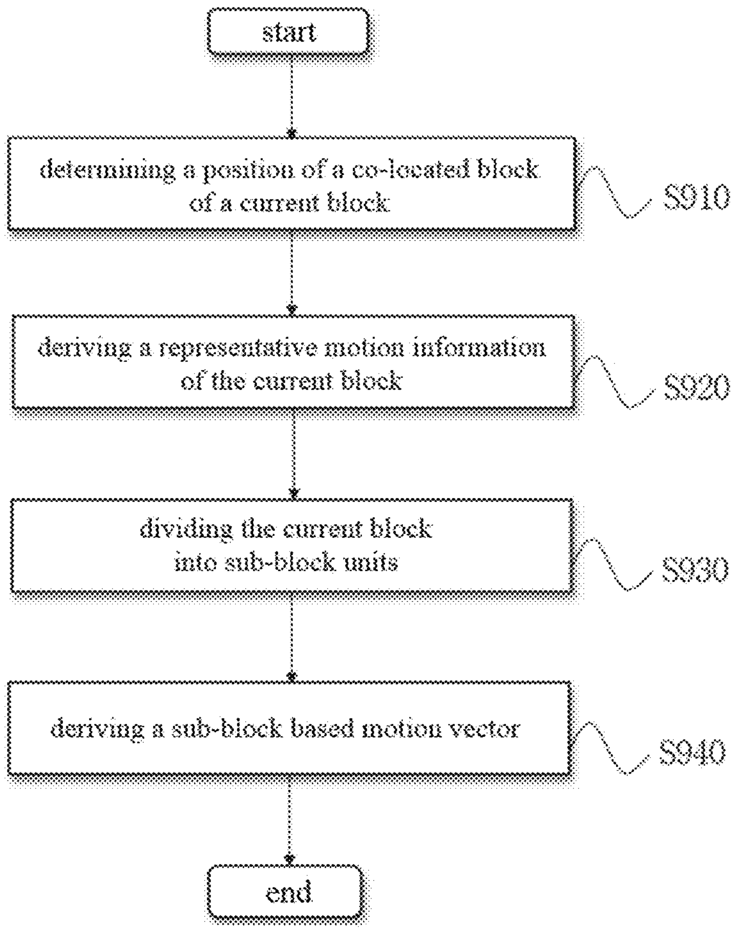

FIGS. 8 and 9 are views respectively showing an image encoding or decoding method using a merge candidate list according to an embodiment of the present invention.

Referring to FIG. 8(*a*), an encoding method according to an embodiment of the present invention may include: S810*a* of deriving a merge candidate of a current block; S820*a* of deriving an additional merge candidate of the current block; S830*a* of determining a merge candidate for encoding the current block; S840*a* of performing motion compensation by using the determined merge candidate; and S850*a* of entropy encoding information on motion compensation.

In addition, referring to FIG. 8(*b*), an decoding method according to an embodiment of the present invention may include: S810*b* of entropy decoding information on motion compensation of a current block; S820*b* of deriving a merge candidate of the current block; S830*b* of deriving an additional merge candidate of the current block; S840*b* of determining a merge candidate for decoding the current block; and 850*b* of performing motion compensation on the current block by using the determined merge candidate.

In addition, referring to FIG. 9, a decoding method according to another embodiment of the present invention Hereinafter, a method of deriving a spatial merge candidate will be described.

Figure 10:
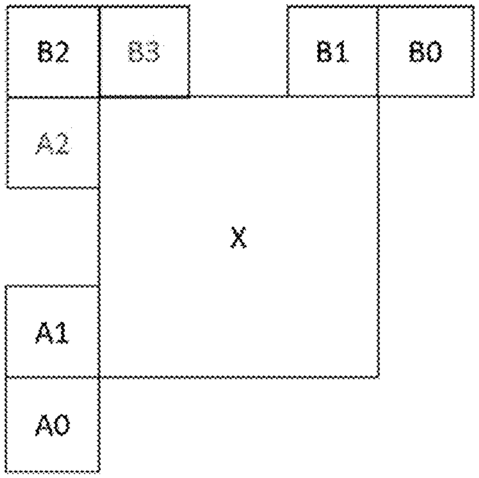
FIG. 10 is a view showing a method of deriving a spatial merge candidate according to an embodiment of the present invention.

FIG. 10 is a view showing a method of deriving a spatial merge candidate according to an embodiment of the present invention, and FIG. 11 is a view showing a method of deriving a merge candidate list by using a spatial merge candidate.

A spatial merge candidate may be derived from a reconstructed block that is spatially adjacent to an encoding/decoding target block. As shown in FIG. 10, motion information may be derived from at least one of a block A1 positioned at the left of an encoding/decoding target block X, a block B1 positioned at the upper of the encoding/decoding target block X, a block B0 positioned at the upper-right corner of the encoding/decoding target block X, a block A0 positioned at the lower-left corner of the encoding/decoding target block X, a block B2 positioned at the upper-left corner of the encoding/decoding target block X, a block A2 positioned at the upper-left of the encoding/decoding target block X, and a block B3 positioned at the upper-left of the encoding/decoding target block X, and the corresponding motion information may be used as a spatial merge candidate of the encoding/decoding target block. Herein, deriving a spatial merge candidate may mean deriving a spatial merge candidate, and adding the same to a merge candidate list.

In addition, in addition to blocks at position of A1, B1, B0, A0, B2, B3, and A2, motion information may be derived from a block positioned between B3 and B1 and/or a block positioned between A2 and A1, and the corresponding motion information may be used as a spatial merge candidate of the encoding/decoding target block.

A reconstructed block spatially adjacent to an encoding/decoding target block may have a square shape or non-square shape. In addition, a block reconstructed spatially adjacent to the encoding/decoding target block may be partitioned on the basis of a sub-block, and at least one spatial merge candidate may be derived for each sub-block.

In addition, whether or not a spatial merge candidate is derived may be determined in an order of blocks from of A1, B1, B0, A0, B2, B3, and A2. In deriving as a spatial merge candidate is available, spatial candidates may be sequentially added to a merge candidate list of the encoding/decoding target block.

For example, when three spatial merge candidates are derived from blocks included in positions of A1, B0, A0, and B2, as shown in FIG. 11, the derived spatial merge candidates may be added to a merge candidate list.

In an example, a spatial merge candidate may be derived up to the preset maximum value. Hereinafter, the preset maximum number of spatial merge candidates may be defined as maxNumSpatialMergeCand. Herein, maxNumSpatialMergeCand may be a positive integer including 0, for example, maxNumSpatialMVPCand may be 4.

In addition, the maximum number of merge candidates that are possibly included in a merge candidate list may be defined as MaxNumMergeCand. Herein, MaxNumMergeCand may be a positive integer including 0. In addition, the number of merge candidates included in a merge candidate list may be defined as numMergeCand.

A prediction list utilization flag may represent whether or not a prediction block is generated by using a corresponding reference picture list. For example, when a prediction list utilization flag has a first value, it may indicate that a prediction block is generated by using a corresponding reference picture list, and when a prediction list utilization flag has a second value, it may indicate that a prediction block is not generated by using a corresponding reference picture list.

In other words, motion information capable of generating a prediction block by using a corresponding reference picture list may be selected by using a prediction list utilization flag, and a prediction block of a current block may be generated by using the corresponding motion information.

A prediction block of a current block may be generated by using motion information associated with a case where a prediction list utilization flag has a first value. In addition, a prediction list utilization flag may be set on the basis of an inter-prediction indicator, and an inter-prediction indicator may be set on the basis of a prediction list utilization flag.

In a case below, it may be determined that the encoder or decoder cannot derive a spatial merge candidate.

A case where all spatial merge candidates are derived from blocks at positions of A0, A1, B0, and B1 when deriving a spatial merge candidate in a block positioned at B2.

A case where no block is present at positions of A1, B1, B0, A0, B2, B3, and A2. In other words, when each current block is positioned in a picture, a slice, or a tile boundary, so that the above blocks are not present.

A case where at least one of blocks A1, B1, B0, A0, B2, B3, and A2 is intra coded.

A case where at least one of a motion vector, a reference picture index, and a reference picture of a spatial merge candidate is identical to at least one of a motion vector, a reference picture index, and a reference picture of a previously derived spatial merge candidate when deriving the corresponding spatial merge candidate in a block at a specific position.

A case where motion information of at least one of blocks A1, B1, B0, A0, B3, and A2 refers to a block outside of a picture, a slice, or a tile boundary.

A spatial merge candidate may be derived on the basis of at least one coding parameter.

Herein, motion information of a spatial merge candidate may include L0 and L1 motion information, and also include three pieces of motion information such as L2 and L3 motion information, etc. Herein, a reference picture list may include at least one piece of motion information such as L0, L1, L2, and L3 motion information, etc.

A spatial merge candidate may be derived from a reconstructed neighbor block of a block that is smaller in size than a specific block in which at least one of information on whether or not to use a skip mode, information on whether or not to use a merge mode, and merge index information is entropy encoded/decoded. In addition, sub-blocks of a block having a specific size may share a spatial merge candidate.

A spatial merge candidate may be derived from a reconstructed neighbor block of a block that is deeper in depth than a specific block in which at least one of information on whether or not to use a skip mode, information on whether or not to use a merge mode, and merge index information is entropy encoded/decoded. In addition, sub-blocks of a block having a specific depth may share a spatial merge candidate.

Herein, sharing a spatial merge candidate may mean adding the same spatial merge candidate to a merge candidate list between blocks, or may mean performing motion compensation by using one common merge candidate list between blocks. Herein, a spatial merge candidate may be included in the common merge candidate list.

Hereinafter, a method of deriving a temporal merge candidate will be described.

Figure 12:
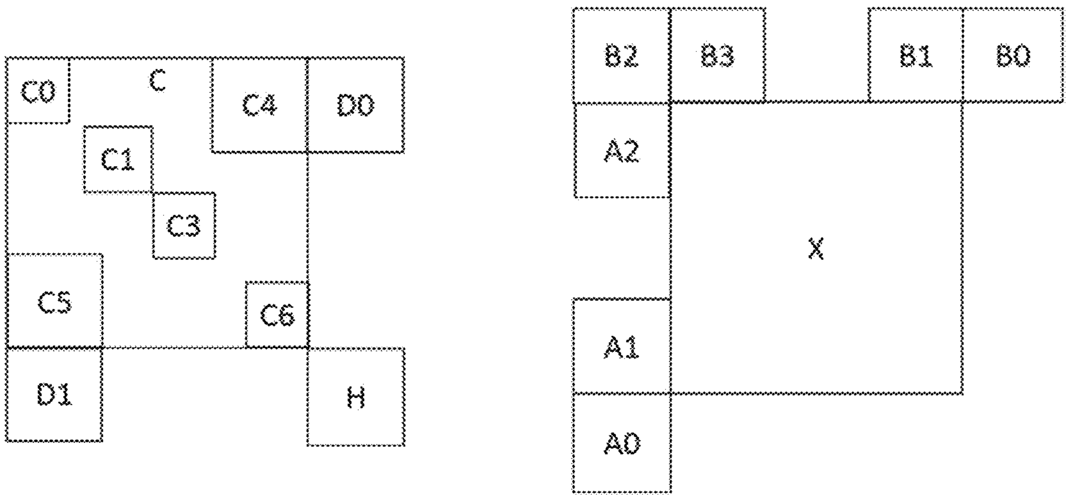
FIG. 12 is a view showing a method of deriving a temporal merge candidate according to an embodiment of the present invention.

FIG. 12 is a view showing a method of deriving a temporal merge candidate according to an embodiment of the present invention, and FIG. 13 is a view showing a method of deriving a merge candidate list by using a temporal merge candidate.

A temporal merge candidate may be derived by using a reference picture (reference image) of a reconstructed block temporally adjacent to an encoding/decoding target block. A reference picture temporally adjacent to an encoding/decoding target block may mean a co-located picture (co-located image). Herein, deriving a temporal merge candidate may mean deriving a temporal merge candidate, and adding the same to a merge candidate list.

For example, as shown in FIG. 12, a temporal merge candidate may be derived by using at least one of a H-positioned block that is outside of a co-located block C associated with the same spatial position of an encoding/decoding target block X within a reference picture of the encode/decode target image, a C3-positioned block, a C4-positioned block, a C5-positioned block, a C6-positioned block, a C0-positioned block, a DO-positioned block, and a D1-positioned.

When a temporal merge candidate is possibly derived from an H-positioned block, a temporal merge candidate may be derived from the H-positioned block, and when a temporal merge candidate is not derived from the H-positioned block, a temporal merge candidate may be derived from the C3 position. In addition, when a temporal merge candidate is not derived from at least one of the H position, the C3 position, the C1 position, the C4 position, the C5 position, the C6 position, the C0 position, the D0 position, and the D1 position, a temporal merge candidate may be derived from at least one block of the H position, the C3 position, the C1 position, the C4 position, the C5 position, the C6 position, the C0 position, the D0 position, and the D1 position except for positions at which the temporal merge candidates cannot be derived.

Herein, when at least one of the predetermined H position, C3 position, C1 position, C4 position, C5 position, C6 position, C0 position, D0 position, and D1 position is encoded/decoded by intra-prediction, a temporal merge candidate cannot be derived from the corresponding position. In addition, M temporal merge candidates may be derived and the derived candidates may be added to a merge candidate list. Herein, M may mean a positive integer equal to or greater than 1.

A co-located block of an encoding/decoding target block may have a square shape or non-square shape. In addition, a co-located block of an encoding/decoding target block may be partitioned on the basis of a sub-block, and at least one temporal merge candidate may be derived for each sub-block.

For example, when one temporal merge candidate is derived at the H position as an example of FIG. 13, the temporal merge candidate derived at the H position may be added to a merge candidate list.

When a distance between an image including an encoding/decoding target block and a reference picture of the encoding/decoding target block differs with a distance between an image including a co-located block and a reference picture of the co-located block, a temporal merge candidate may be derived by performing scaling on a motion vector.

Herein, a prediction list utilization flag may represent whether or not a prediction block is generated by using a corresponding reference picture list. For example, when a prediction list utilization flag has a first value, it may indicate that a prediction block is generated by using a corresponding reference picture list, and when a prediction list utilization flag has a second value, it may indicate that a prediction block is not generated by using a corresponding reference picture list.

A prediction block of a current block may be generated by using motion information associated with a case where a prediction list utilization flag has a first value. In other words, motion information capable of generating a prediction block by using a corresponding reference picture list may be selected by using a prediction list utilization flag, and a prediction block of a current block may be generated by using the corresponding motion information.

A temporal merge candidate may be derived on the basis of at least one coding parameter.

Herein, motion information of a temporal merge candidate may include L0 and L1 motion information, and also include three pieces of motion information such as L2 and L3 motion information, etc. Herein, a reference picture list may include at least one piece of motion information such as L0, L1, L2, and L3 motion information, etc.

For example, when an inter-prediction indicator of an encoding/decoding target block is PRED_L0, L0 motion information in a co-located block may be derived as a temporal merge candidate. In addition, when an inter-prediction indicator of an encoding/decoding target block is PRED_L1, L1 motion information in a co-located block may be derived as a temporal merge candidate. In addition, when an inter-prediction indicator of an encoding/decoding target block is PRED_L2, L2 motion information in a co-located block may be derived as a temporal merge candidate. In addition, when an inter-prediction indicator of an encoding/decoding target block is PRED_L3, L3 motion information in a co-located block may be derived as a temporal merge candidate.

In addition, when an inter-prediction indicator of an encoding/decoding target block is PRED_BI, at least two pieces of L0, L1, L2, and L3 motion information in a co-located block may be derived as a temporal merge candidate. In addition, when an inter-prediction indicator of an encoding/decoding target block is PRED_TRI, at least three pieces of L0, L1, L2, and L3 motion information in a co-located block may be derived as a temporal merge candidate. In addition, when an inter-prediction indicator of an encoding/decoding target block is PRED_QUAD, at least four pieces of L0, L1, L2, and L3 motion information in a co-located block may be derived as a temporal merge candidate.

Sub-blocks of a block having a specific size, in which at least one of information on whether or not to use a skip mode, information on whether or not to use a merge mode, and merge index information is entropy encoded/decoded, may share a temporal merge candidate.

In addition, sub-blocks of a block having a specific depth, in which at least one of information on whether or not to use a skip mode, information on whether or not to use a merge mode, and merge index information is entropy encoded/decoded, may share a temporal merge candidate.

Herein, sharing a temporal merge candidate may mean adding the same temporal merge candidate to a merge candidate list between blocks, or may mean performing motion compensation by using one common merge candidate list between blocks. Herein, a temporal merge candidate may be included in the common merge candidate list.

The above-described co-located picture may be determined on the basis of a coding parameter. In addition, the above-described co-located block may be determined on the basis of a coding parameter. In addition, a prediction list utilization flag may be determined on the basis of a coding parameter. In addition, a reference picture index of the temporal merge candidate may be determined on the basis of a coding parameter.

In an example, temporal merge candidates may be derived up to the preset maximum number. Hereinafter, the preset maximum number of spatial merge candidates may be defined as maxNumTemporalMergeCand. Herein, maxNumTemporalMergeCand may be a positive integer including 0, for example, maxNumTemporalMergeCand may be 1.

After deriving at least one of spatial merge candidates and temporal merge candidates, the encoder or decoder may generate a merge candidate list by sequentially adding the candidates to the merge candidate list in an order of the derived merge candidates.

After deriving at least one of spatial merge candidates and temporal merge candidates, redundancy checking whether or not the candidates have motion information different from each other may be performed in an order of the derived merge candidates. A merge candidate list may be generated according to the checking result and the maximum number of usable merge candidates (MaxNumMergeCand).

A candidate list including the maximum number of usable merge candidates (MaxNumMergeCand) may include at least one temporal merge candidate. In order to include at least one temporal merge candidate, the encoder or decoder may exclude at least one of the derived spatial merge candidate from the merge candidate list.

Hereinafter, a motion vector scaling method will be described.

Figure 14:
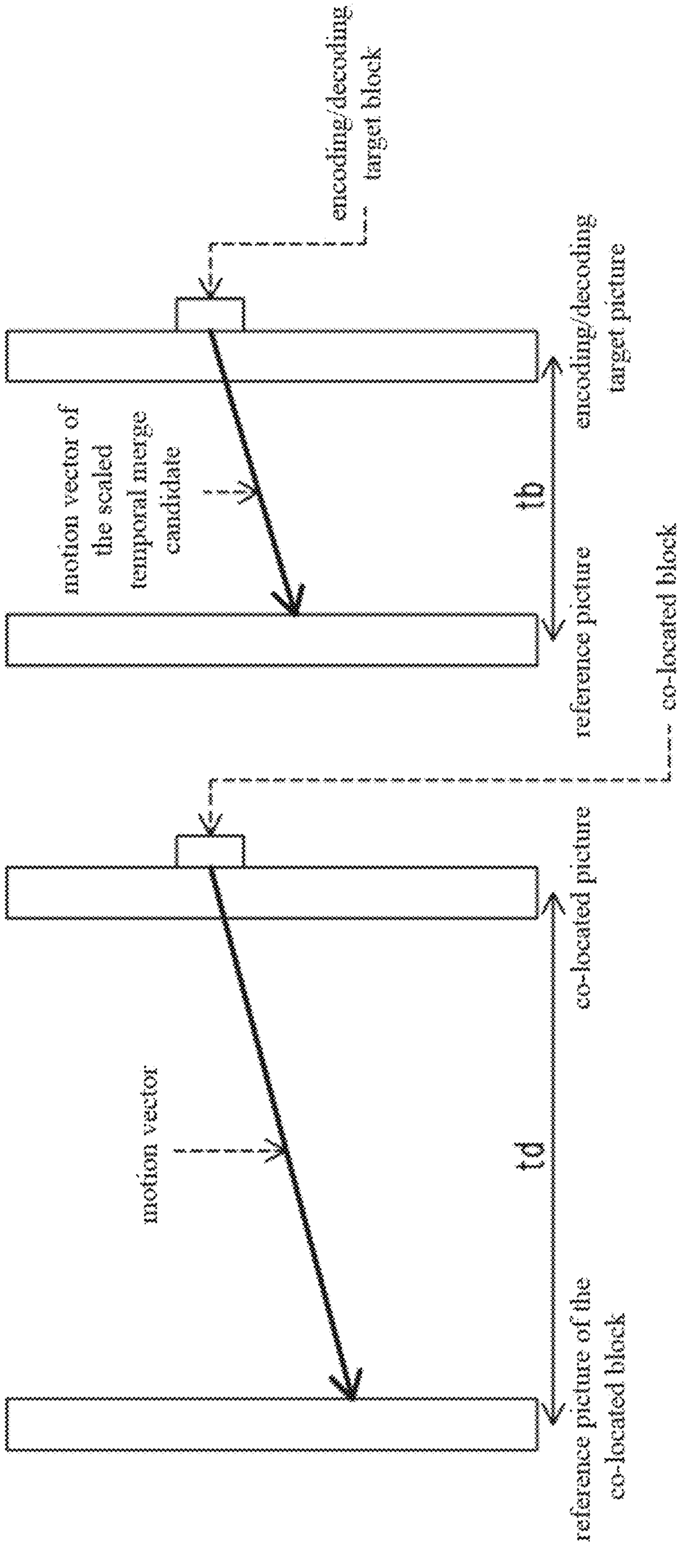
FIG. 14 is a view showing performing scaling on a motion vector.

FIG. 14 is a view showing performing scaling on a motion vector.

In FIG. 14, td may mean a difference value between a picture order count (POC) of a co-located picture (co-located image) and a POC of a reference picture of a co-located block within a co-located picture spatially associated with an encoding/decoding target block in position. tb may mean a difference value between a POC of an encoding/decoding target image and a POC of a reference picture of the encoding/decoding target block.

In an example, at least one of a td value and a tb value may be adjusted such that the td value or tb value is included in a range between −128 and 127.

For example, when a td value or tb value is smaller than −128, the td value or tb value may be adjusted to −128, and when a td value or tb value is greater than 127, the td value or tb value may be adjusted to 127. When a td value or tb value is included in a range between −128 and 127, the td value or tb value may not be adjusted. In other words, clipping may be performed on a tb value or tb value such that the tb value or tb value belongs to a range of constant value.

In an example, a tx value may be derived according to Equation 1 below. In below, Abs( ) may represent an absolute value function, and an output value of the corresponding function may be an absolute value of an input value.

$$tx = (16384 + \mathrm{Abs}(td/2))/td \qquad \text{[Equation 1]}$$

Meanwhile, a scaling factor that is DistScaleFactor may be determined as (tb*tx+32)>>6, and a DistScaleFactor value may be adjusted to be included in a range between −1024 and 1023.

A motion vector, for which scaling is performed, of a temporal merge candidate may be derived according to Equation 2 below. Sign( ) may output information on a sign of a specific value, and—may be output for Sign(−1). mvCol may represent a value of a motion vector, before performing scaling, of a temporal merge candidate.

$$Mv = \mathrm{Sign}(DistScaleFactor * mvCol) * ((\mathrm{Abs}(DistScaleFactor * mvCol) + 127) \gg 8) \qquad \text{[Equation 2]}$$

Hereinafter, a method of deriving additional merge candidates except for a temporal merge candidate and a spatial merge candidate according to various examples of the present invention will be described.

An additional merge candidate according to various examples of the present invention may mean at least one of a modified spatial merge candidate, an advanced temporal merge candidate, a sub-block-based temporal merge candidate, a combined merge candidate, a merge candidate having a predetermined motion information value, and an affine merge candidate. Hereinafter, deriving an additional merge candidate may mean deriving an additional merge candidate, and adding the derived candidate to a merge candidate list.

A modified spatial merge candidate may mean a merge candidate in which at least one of motion information of the derived spatial merge candidate is modified.

In addition, an advanced temporal merge candidate may mean a merge candidate in which at least one of motion information of the derived temporal merge candidate is modified.

In addition, a combined merge candidate may mean a merge candidate generated by using at least one piece of motion information of a spatial merge candidate, a temporal merge candidate, a modified spatial merge candidate, an advanced temporal merge candidate, a combined merge candidate, a merge candidate having a predetermined motion information value which are present in a merge candidate list.

In addition, a combined merge candidate may mean a merge candidate generated by deriving at least one of a spatial merge candidate and a temporal merge candidate from a block that is not present in a merge candidate list but from which at least one of a spatial merge candidate and a temporal merge candidate is derived, and by using at least one piece of motion information of the derived spatial merge candidate, the derived temporal merge candidate, the modified spatial merge candidate, the advanced temporal merge candidate, the sub-block-based temporal merge candidate, the combined merge candidate, and the merge candidate having a predetermined motion information value.

In addition, the decoder may derive a combined merge candidate by using motion information entropy decoded from a bitstream. Herein, the encoder may entropy encode motion information used when deriving a combined merge candidate into a bitstream.

A combined merge candidate may mean a combined bi-prediction merge candidate. A combined bi-prediction merge candidate may be a merge candidate using bi-prediction, and mean a merge candidate having L0 motion information and L1 motion information.

In addition, a combined merge candidate may mean a merge candidate having at least N pieces of motion information among L0 motion information, L1 motion information, L2 motion information, and L3 motion information. Herein, N may be 2, 3, and 4, and mean a positive integer equal to or greater than 2.

In addition, a merge candidate having a predetermined motion information value may mean a merge candidate having a motion vector of (0, 0).

In addition, at least one of a modified spatial merge candidate, an advanced temporal merge candidate, a sub-block-based temporal merge candidate, a combined merge candidate, and a merge candidate having a predetermined motion information value may be derived or generated on the basis of at least one coding parameter. In addition, at least one of a modified spatial merge candidate, an advanced temporal merge candidate, a sub-block-based temporal merge candidate, a combined merge candidate, a merge candidate having a predetermined motion information value may be added to a merge candidate list on the basis of at least one coding parameter.

In addition, at least one of a modified spatial merge candidate, an advanced temporal merge candidate, a combined merge candidate, and a merge candidate having a predetermined motion information value may be derived for each sub-block, and the merge candidate derived for each sub-block may be added to a merge candidate list.

Deriving an additional merge candidate may be performed when a current picture or slice is a slice or picture using a B slice/B picture or uses at least M reference picture lists. Herein, M may be 2, 3, and 4, and mean a positive integer equal to or greater than 2.

The above-described modified spatial merge candidate, advanced temporal merge candidate, sub-block-based temporal merge candidate, combined merge candidate, merge candidate having a predetermined motion information value may be derived up to N candidates. Herein, N is a positive integer including 0.

In addition, a spatial merge candidate or temporal merge candidate may be added to a merge candidate list until the list becomes a preset size, and the merge candidate list may increase in size as many as the number of combined merge candidates or may increase in size to a size smaller than the number of combined merge candidates.

In addition, a size of a merge candidate list may be determined on the basis of a coding parameter, and the merge candidate list may vary in size on the basis of a coding parameter.

When at least one merge candidate is present in a merge candidate list, or when the number of merge candidates (numOrigMergeCand) within the merge candidate list before deriving a combined merge candidate is smaller than the maximum number of merge candidates (MaxNumMergeCand), deriving a combined merge candidate may be performed as below.

FIG. 15 is a view showing a method of deriving a combined merge candidate according to an embodiment of the present invention, and FIG. 16 is a view showing a method of deriving a merge candidate list by using a combined merge candidate.

First, numInputMergeCandis is set as numMergeCand. A combined index (combIdx) may be set to 0. Subsequently, a K (numMergeCand−numInputMergeCand)-th combined merge candidate may be derived.

Subsequently, an L0 candidate index (l0CandIdx), an L1 candidate index (l1CandIdx), an L2 candidate index (l2CandIdx), and an L3 candidate index (l3CandIdx) may be derived by using a combination index shown in FIG. 15. Each candidate index may indicate a merge candidate within a merge candidate list, and L0, L1, L2, and L3 motion information on a combined merge candidate may be derived by combining motion information indicated by the candidate index.

Subsequently, an L0 candidate (l0Cand) may be derived as a merge candidate (mergeCandList [l0CandIdx]) associated with an L0 candidate index within a merge candidate list, an L1 candidate (l1Cand) may be derived as a merge candidate (mergeCandList [l1CandIdx]) associated with an L1 candidate index within the merge candidate list, an L2 candidate (l2Cand) may be derived as a merge candidate (mergeCandList [l2CandIdx]) associated with an L2 candidate index within the merge candidate list, and an L3 candidate (l3Cand) may be derived as a merge candidate (mergeCandList [l3CandIdx]) associated with an L3 candidate index within the merge candidate list.

Subsequently, when the L0 candidate uses L0 uni-directional prediction (predFlagL0l0Cand==1), the L1 candidate uses L1 uni-directional prediction (predFlagL1l1Cand==1), the L2 candidate uses L2 uni-directional prediction (predFlagL2l2Cand==1), and the L3 candidate uses L3 uni-directional prediction (predFlagL313Cand=1), a step 1 below may be performed. However, when at least one of the above cases is not satisfied, a step 2 below may be performed when at least one of two cases is satisfied which are a case where at least one of the L0, L1, L2, and L3 candidates differs in reference picture with a reference picture of another candidate, and a case where at least one of the L0, L1, L2, and L3 candidates differs in motion vector with a motion vector of another candidate.

Step 1) L0 motion information of an L0 candidate may be determined as L0 motion information of a combined candidate, L1 motion information of an L1 candidate may be determined as L1 motion information of the combined candidate, L2 motion information of an L2 candidate may be determined as L2 motion information of the combined candidate, and L3 motion information of an L3 candidate may be determined as L3 motion information of the combined candidate. The encoder or decoder may add a combined merge candidate (combCandk) to the merge candidate list.

In an example, motion information of a combined merge candidate may be determined as Equation 3 below.

[Equation 3]

$$L0 \text{ reference picture index } (refIdxL0combCandk) \text{ of } K\text{-th combined merge candidate} = L0 \text{ reference picture index } (refIdxL010Cand) \text{ of } L0 \text{ candidate}$$

$$L1 \text{ reference picture index } (refIdxL1combCandk) \text{ of } K\text{-th combined merge candidate} = L1 \text{ reference picture index } (refIdxL111Cand) \text{ of } L1 \text{ candidate}$$

$$L2 \text{ reference picture index } (refIdxL2combCandk) \text{ of } K\text{-th combined merge candidate} = L2 \text{ reference picture index } (refIdxL212Cand) \text{ of } L2 \text{ candidate}$$

$$L3 \text{ reference picture index } (refIdxL3combCandk) \text{ of } K\text{-th combined merge candidate} = L3 \text{ reference picture index } (refIdxL313Cand) \text{ of } L3 \text{ candidate}$$

$$L0 \text{ prediction list utilization flag } (predFlagL0combCandk) \text{ of } K\text{-th combined merge candiate} = 1$$

$$L1 \text{ prediction list utilization flag } (predFlagL1combCandk) \text{ of } k\text{-th combined merge candiate} = 1$$

$$L2 \text{ prediction list utilization flag } (predFlagL2combCandk) \text{ of } k\text{-th combined merge candiate} = 1$$

$$L3 \text{ prediction list utilization flag } (predFlagL3combCandk) \text{ of } k\text{-th combined merge candiate} = 1$$

$$x \text{ component } (mvL0combCandk[0]) \text{ of } L0 \text{ motion vector of } k\text{-th combined merge candidate} = x \text{ component } (mvL010Cand[0]) \text{ of } L0 \text{ motion vector of } L0 \text{ candidate}$$

$$y \text{ component } (mvL0combCandk[1]) \text{ of } L0 \text{ motion vector of } k\text{-th combined merge candidate} = y \text{ component } (mvL010Cand[1]) \text{ of } L0 \text{ motion vector of } L0 \text{ candidate}$$

$$x \text{ component } (mvL1combCandk[0]) \text{ of } L1 \text{ motion vector of } k\text{-th combined merge candidate} = x \text{ component } (mvL111Cand[0]) \text{ of } L1 \text{ motion vector of } L1 \text{ candidate}$$

$$y \text{ component } (mvL1combCandk[1]) \text{ of } L1 \text{ motion vector of } k\text{-th combined merge candidate} = y \text{ component } (mvL111Cand[1]) \text{ of } L1 \text{ motion vector of } L1 \text{ candidate}$$

$$x \text{ component } (mvL2combCandk[0]) \text{ of } L2 \text{ motion vector of } k\text{-th combined merge candidate} = x \text{ component } (mvL212Cand[0]) \text{ of } L2 \text{ motion vector of } L2 \text{ candidate}$$

$$y \text{ component } (mvL2combCandk[1]) \text{ of } L2 \text{ motion vector of } k\text{-th combined merge candidate} = y \text{ component } (mvL212Cand[1]) \text{ of } L2 \text{ motion vector of } L2 \text{ candidate}$$

$$x \text{ component } (mvL3combCandk[0]) \text{ of } L3 \text{ motion vector of } k\text{-th combined merge candidate} = x \text{ component } (mvL313Cand[0]) \text{ of } L3 \text{ motion vector of } L3 \text{ candidate}$$

$$y \text{ component } (mvL3combCandk[1]) \text{ of } L3 \text{ motion vector of } k\text{-th combined merge candidate} = y \text{ component } (mvL313Cand[1]) \text{ of } L3 \text{ motion vector of } L3 \text{ candidate}$$

$$numMergeCand = numMergeCand + 1$$

Step 2) the encoder or decode may increase a combination index by 1 without deriving motion information.

Subsequently, when the combination index is equal to (numOrigMergeCand (numOrigMergeCand−1)), or when the number of merge candidate lists (numMergeCand) within the current merge candidate list is equal to MaxNumMergeCand, deriving the combined merge candidate may be ended, otherwise, the above-described method of deriving the combined merge candidate may be performed from the beginning.

For example, as an example of FIG. 16, the derived combined merge candidate may be added to a merge candidate list. FIG. 16 is a view showing an example of deriving a combined merge candidate by using at least one of a spatial merge candidate, a temporal merge candidate, and a zero merge candidate, and adding the derived combined merge candidate to a merge candidate list.

Herein, a merge candidate having at least one of L0 motion information, L1 motion information, L2 motion information, and L3 motion information may be included in a merge candidate list.

Each piece of the motion information may include at least one of a motion vector, a reference picture index, and a prediction list utilization flag.

At least one of merge candidates within a merge candidate list may be determined as a final merge candidate. Motion information of the determined merge candidate may be used as motion information of an encoding/decoding target block. In other words, the encoder or decoder may use the motion information for inter-prediction or motion compensation of the encoding/decoding target block.

The encoder or decoder may generate a prediction block of an encoding/decoding target block by using at least one of L0 motion information, L1 motion information, L2 motion information, and L3 motion information of a final merge candidate, and use the generated prediction block for inter-prediction or motion compensation of the encoding/decoding target block.

An inter-prediction indicator may be represented as uni-directional prediction PRED_LX indicating PRED_L0 or PRED_L1 or as bi-directional prediction PRED_BI_LX for a reference picture list X when at least one of L0 motion information, L1 motion information, L2 motion information, and L3 motion information is used for generating a prediction block. Herein, X may mean a positive integer including 0, and may be one of 0, 1, 2, and 3.

In addition, an inter-prediction indicator may be represented as PRED_TRI indicating three-directional prediction when at least three of the L0, motion information, L1 motion information, L2 motion information, and L3 motion information are used for generating a prediction block.

In addition, an inter-prediction indicator may be represented as PRED_QUAD indicating four-directional prediction when all of L0 motion information, L1 motion information, L2 motion information, and L3 motion information are used.

In an example, when an inter-prediction indicator of a reference picture list L0 may be PRED_L0 and an inter-prediction indicator of a reference picture list L1 may be PRED_BI_L1, an inter-prediction indicator of an encoding/decoding target block may be PRED_TRI. In other words, the sum of the number of prediction blocks indicated by the inter-prediction indicator of each reference picture list may become the inter-prediction indicator of the encoding/decoding target block.

In addition, a reference picture list may be at least one of L0, L1, L2, and L3. Herein, a merge candidate list may be generated for each reference picture list. Accordingly, when generating a prediction block of an encoding/decoding target block, at least one to at most N prediction blocks may be generated and used for inter-prediction or motion compensation of an encoding/decoding target block. Herein, N may be a positive integer equal to or greater than 1, and may be 1, 2, 3, 4, etc.

In order to reduce a memory bandwidth and improve a processing speed when performing motion compensation using a combined merge candidate, a combined merge candidate may be derived when at least one of a reference picture index and a motion vector value of a merge candidate is identical with another merge candidate or included in a predetermined range.

In an example, a combined merge candidate may be derived by using merge candidates having the same reference picture index of a predetermined value among merge candidates included in a merge candidate list. Herein, the predetermined value may be a positive integer including 0.

In another example, a combined merge candidate may be derived by using merge candidates having a reference picture index included in a predetermined range among merge candidates included in a merge candidate list. Herein, the predetermined range may be a range including a positive integer including 0.

In another example, a combined merge candidate may be derived by using merge candidates having a motion vector value included in a predetermined range among merge candidates included in a merge candidate list. Herein, the predetermined range may be a range including a positive integer including 0.

In another example, a combined merge candidate may be derived by using merge candidates in which a difference between motion vector values thereof is included in a predetermined range among merge candidates included in a merge candidate list. Herein, the predetermined range may be a range including a positive integer including 0.

Herein, at least one of the predetermined value and the predetermined range may be determined on the basis of a value preset in the encoder/decoder. In addition, at least one of the predetermined value and the predetermined range may be determined on the basis of an entropy encoded/decoded value.

In addition, In deriving a modified spatial merge candidate, an advanced temporal merge candidate, a sub-block-based temporal merge candidate, a combined merge candidate, and a merge candidate having a predetermined motion information value, at least one of the above-described merge candidate may be added to a merge candidate list when at least one of a reference picture index and a motion vector value of a merge candidate is identical with another merge candidate or included in a predetermined range.

Figure 17:
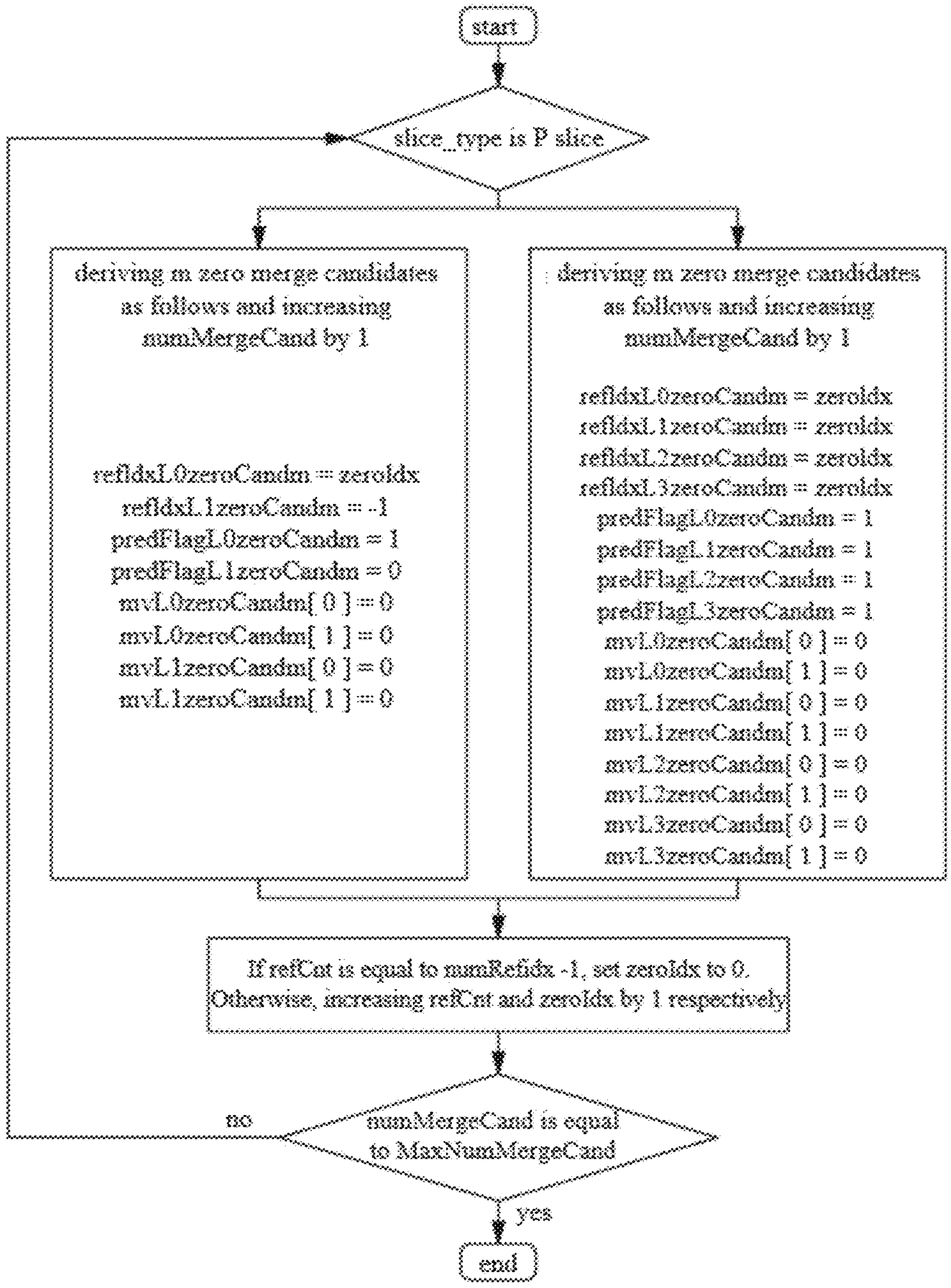
FIG. 17 is a view of a flowchart showing a method of deriving a merge candidate list by using a zero (0) merge candidate according to an embodiment of the present invention.

FIG. 17 is a view of a flowchart showing a method of deriving a merge candidate list by using a zero (0) merge candidate according to an embodiment of the present invention.

The encoder or decoder may derive a zero merge candidate having a motion vector of (0, 0).

Herein, the zero merge candidate may be determined as at least one of examples below.

First, a zero merge candidate may be a candidate having a motion vector of (0, 0) and a reference picture index of a value equal to or greater than 0. Second, a zero merge candidate may be a candidate having a motion vector of (0, 0) and a reference picture index of a value of 0.

Herein, a zero merge candidate may mean a merge candidate where at least one of L0 motion information, L1 motion information, L2 motion information, and L3 motion information has a motion vector of (0, 0).

In an example, the first-typed zero merge candidate may be added to a merge candidate list without any condition. Meanwhile, the second-typed zero merge candidate may be derived when a merge candidate list is not full with merge candidates, and added to the merge candidate list.

In addition, when a merge candidate list is not full with merge candidates, at least one of the first-typed zero merge candidate and the second-typed zero merge candidate may be repeatedly added to the merge candidate list until the merge candidate list becomes full.

FIG. 18 is a view showing a method of deriving a merge candidate list by using a zero merge candidate.

When the number of merge candidate list (numMergeCand) within a current merge candidate list is smaller than MaxNumMergeCand, adding a zero merge candidate may be performed as an example of FIG. 18.

First, the pre-input number of merge candidates (numInputMergeCand) may be set as numMergeCand. Subsequently, an m (numMergeCand−numInputMergeCand)-th zero merge candidate may be derived. When a slice type (slice_type) of a current slice is a P slice, the number of reference pictures (numRefIdx) may be set as the number of usable reference pictures (num_ref_idx_l0_active_minus1+1) within an L0 list.

Meanwhile, when a slice type is not a P slice (when a slice type is a B slice or another slice), the number of reference pictures may be set to a value smaller than at least one of the number of usable reference pictures within an L0 list (num_ref_idx_l0_active_minus1+1), the number of usable reference picture within an L1 (num_ref_idx_l1_active_minus1+1), the number of usable reference pictures within an L2 list (num_ref_idx_l2_active_minus1+1), and the number of usable reference pictures within an L3 list (num_ref_idx_l3_active_minus1+1).

In an example, when a slice type of a current slice is a P slice, a step 1 below may be performed. Meanwhile, when a slice type of a current slice is not a P slice (when a slice type is a B slice or another slice), a step 2 below may be performed.

According to a step 1, a zero merge candidate may be derived according to Equation 4 below, and numMergeCand may be increased by 1 after the deriving.

$$\begin{aligned}
&L0 \text{ reference picture index } (refIdxL0zeroCandm) \text{ of } m\text{-th zero merge candidate} = \\
&\quad \text{reference picture index } (zeroIdx) \text{ of zero merge candidate} \\
&L1 \text{ reference picture index } (refIdxL1zeroCandm) \text{ of } m\text{-th zero merge candidate} = -1 \\
&L0 \text{ prediction list utilization flag } (predFlagL0zeroCandm) \text{ of } m\text{-th zero merge candidate} = 1 \\
&L1 \text{ prediction list utilization flag } (predFlagL1zeroCandm) \text{ of } m\text{-th zero merge candidate} = 0 \\
&x \text{ component } (mvL0zeroCandm[0]) \text{ of } L0 \text{ motion vector of } m\text{-th zero merge candidate} = 0 \\
&y \text{ component } (mvL0zeroCandm[1]) \text{ of } L0 \text{ motion vector of } m\text{-th zero merge candidate} = 0 \\
&x \text{ component } (mvL1zeroCandm[0]) \text{ of } L1 \text{ motion vector of } m\text{-th zero merge candidate} = 0 \\
&y \text{ component } (mvL1zeroCandm[1]) \text{ of } L1 \text{ motion vector of } m\text{-th zero merge candidate} = 0
\end{aligned} \quad \text{[Equation 4]}$$

However, according to a step 2, a zero merge candidate may be derived according to Equation 5 below, and numMergeCand may be increased by 1 after the deriving.

$$\begin{aligned}
&refIdxL0zeroCandm = zeroIdx \\
&refIdxL1zeroCandm = zeroIdx \\
&refIdxL2zeroCandm = zeroIdx \\
&refIdxL3zeroCandm = zeroIdx \\
&predFlagL0zeroCandm = 1 \\
&predFlagL1zeroCandm = 1 \\
&predFlagL2zeroCandm = 1 \\
&predFlagL3zeroCandm = 1 \\
&mvL0zeroCandm[0] = 0 \\
&mvL0zeroCandm[1] = 0 \\
&mvL1zeroCandm[0] = 0 \\
&mvL1zeroCandm[1] = 0 \\
&mvL2zeroCandm[0] = 0 \\
&mvL2zeroCandm[1] = 0 \\
&mvL3zeroCandm[0] = 0 \\
&mvL3zeroCandm[1] = 0
\end{aligned} \quad \text{[Equation 5]}$$

Subsequently, when a reference picture count (refCnt) is equal to (numRefIdx−1), a zeroIdx may be set to 0, otherwise, refCnt and zeroIdx may be respectively increased by 1.

Subsequently, when numMergeCand and MaxNumMergeCand are identical, deriving a zero merge candidate may be ended, otherwise, the above described method of deriving the zero merge candidate may be performed from the beginning.

For example, as an example of FIG. 18, a zero merge candidate may be added to a merge candidate list.

Hereinafter, a method of deriving sub-block-based motion information according to an embodiment of the present invention will be described.

In deriving sub-block-based motion information by partitioning a current block into sub-blocks, motion information of a reconstructed co-located block of a reference picture temporally adjacent to the current block may be used. Herein, a reference picture temporally adjacent to the current block may mean a co-located picture (co-located image). Herein, deriving sub-block-based motion information on a current block may mean deriving an advanced temporal merge candidate or a sub-block-based temporal merge candidate, and adding the candidate to a merge candidate list. The co-located picture may be derived by using information on a directional indicator where the co-located picture is positioned, and information on a co-located picture indicator which are signaled on the basis of an SPS, a PPS, a sub-picture, a slice header, a CTU, a tile, and a brick. For example, information on a directional indicator where a co-located picture is positioned may be represented as collocated_from_l0_flag, and information on a co-located picture indicator may be represented as collocated_ref_idx.

First, a method of determining a position of a co-located block according to an embodiment of the present invention will be described.

Figure 19:
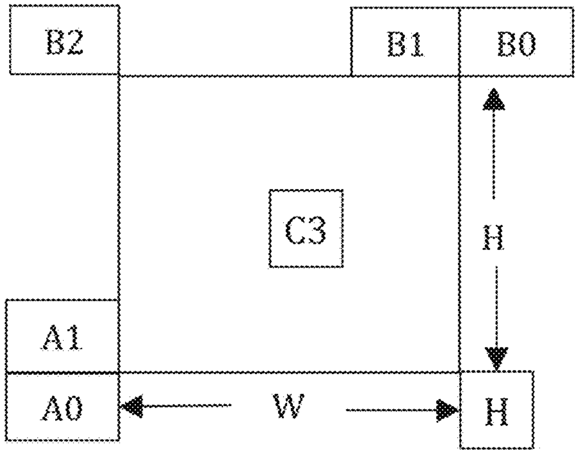
FIG. 19 to FIG. 21 are views respectively showing a method of determining a position of a co-located block.
Figure 20:
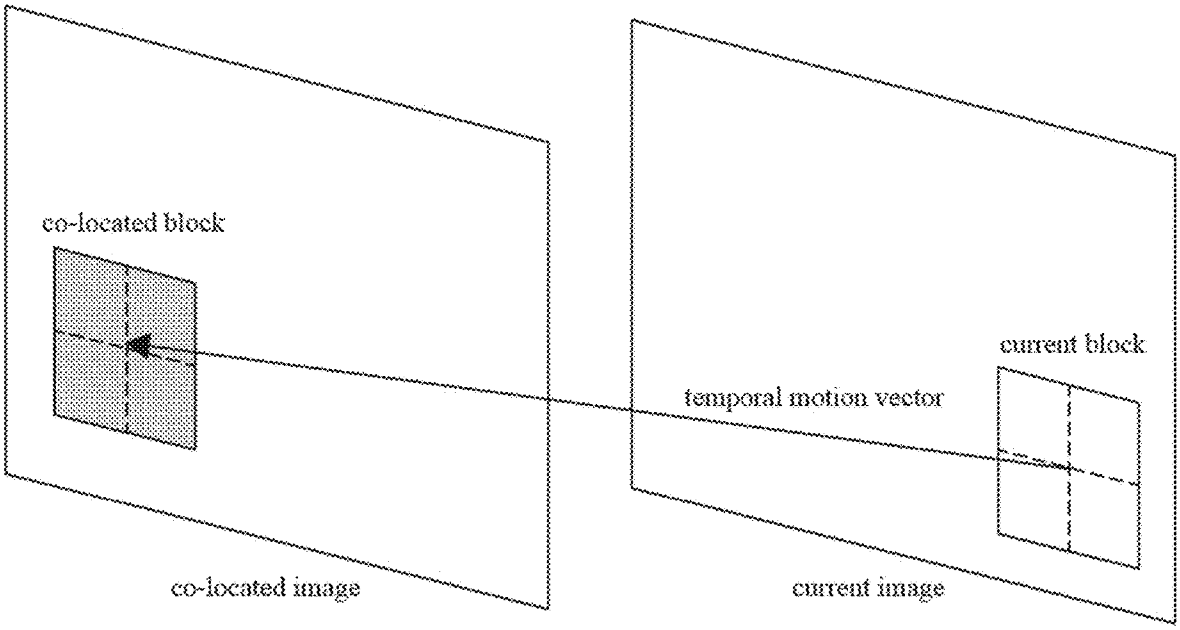
Figure 21:
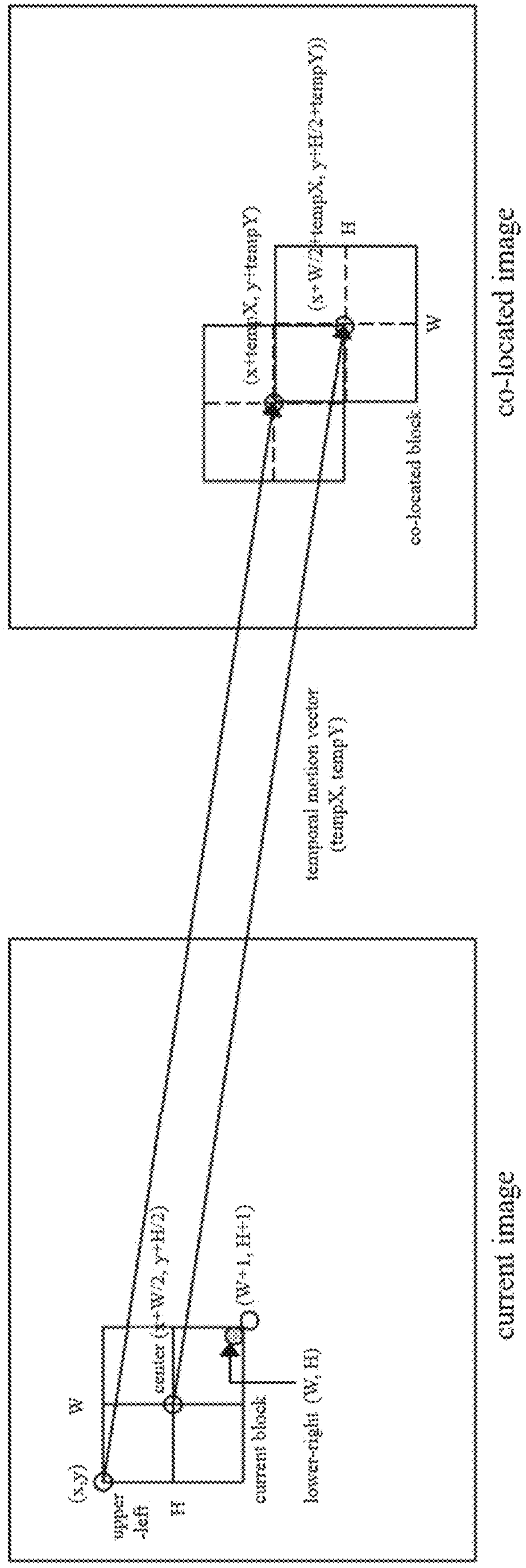

FIGS. 19 to 21 are views respectively showing a method of determining a position of a co-located block.

In determining a position of a co-located block of a current block within a co-located picture, at least one piece of motion information of blocks spatially adjacent to the current block may be used.

For example, as shown in FIG. 18, among blocks A0, A1, B0, B1, and B2 spatially adjacent to a current block, a position of a block corresponding to the current block within a co-located picture may be determined by using a motion vector of a neighbor block having a reference picture identical to the co-located picture of the current block as a temporal motion vector.

A temporal motion vector used for determining the co-located block of the current block may be determined by using one of examples below.

In an example, a motion vector of the first block using a reference picture identical to a co-located picture may be used as a temporal motion vector for determining a position of a co-located block by determining reference picture of neighbor block in a predetermined order.

For example, in an order of A1, B1, B0, A0, and B2 which is an order of constituting a spatial merge candidate list, whether or not a reference picture of each block is identical to a co-located picture may be determined, and a motion vector of the first block having the identical image may be used as a temporal motion vector.

Herein, when reference pictures of all neighbor blocks are not identical to a co-located picture, a default motion vector may be used as a temporal motion vector. Hereinafter, a default motion vector may be a vector having values of vertical and horizontal directional components of 0. Hereinafter, a vector having values of vertical and horizontal directional components of 0 which is a default motion vector may mean a zero motion vector (zero vector).

When reference pictures of all neighbor blocks are not identical to a co-located picture, deriving sub-block-based motion information on a current block may not be performed.

In another example, whether or not a reference picture is identical to a co-located picture may be determined for one neighbor block at a fixed position spatially adjacent to a current block, and a motion vector of the one neighbor block may be used as a temporal motion vector used for determining a position of a co-located block.

For example, when motion information of the left neighbor block A1 is available, whether or not a reference picture of an A1 block is identical to a co-located picture may be determined. When two images are identical, a motion vector of the A1 block may be used as a temporal motion vector.

When a reference picture of the A1 block is not identical to the co-located picture or motion information is not available, a default motion vector may be used as a temporal motion vector. Alternatively, when a reference picture of the A1 block is not identical to the co-located picture, deriving sub-block-based motion information on a current block may not be performed.

In another example, when motion information of the lower-left neighbor block A0 is usable, whether or not a reference picture of an A0 block is identical to a co-located picture may be determined. When two images are identical, a motion vector of the A0 block may be used as a temporal motion vector.

When a reference picture of the A0 block is not identical to the co-located picture or motion information is not usable, a default motion vector may be used as a temporal motion vector. Alternatively, when a reference picture of the A0 block is not identical to the co-located picture, deriving sub-block-based motion information on a current block may not be performed.

In another example, when motion information of the upper neighbor block B1 is usable, whether or not a reference picture of the B1 block is identical to a co-located picture may be determined. When two images are identical, a motion vector of the B1 block may be used as a temporal motion vector.

When a reference picture of the B1 block is not identical to the co-located picture or motion information is not usable, a default motion vector may be used as a temporal motion vector. Alternatively, when a reference picture of the B1 block is not identical to the co-located picture, deriving sub-block-based motion information on a current block may not be performed.

In another example, when motion information of the upper-right neighbor block B0 is usable, whether or not a reference picture of a B0 block is identical to a co-located picture may be determined. When two images are identical, a motion vector of the B0 block may be used as a temporal motion vector.

When a reference picture of the B0 block is not identical to the co-located picture or motion information is not usable, a default motion vector may be used as a temporal motion vector. Alternatively, when a reference picture of the B0 block is not identical to the co-located picture, deriving sub-block-based motion information on a current block may not be performed.

In another example, when motion information of the upper-left neighbor block B2 is usable, whether or not a reference picture of a B2 block is identical to a co-located picture may be determined. When two images are identical, a motion vector of the B2 block may be used as a temporal motion vector.

When a reference picture of the B2 block is not identical to the co-located picture or motion information is not usable, a default motion vector may be used as a temporal motion vector. Alternatively, when a reference picture of the B2 block is not identical to the co-located picture, deriving sub-block-based motion information on a current block may not be performed.

Herein, when a plurality of blocks using a reference picture identical to a co-located picture is present, indicator information on a block used for a temporal motion vector may be signaled from the encoder to the decoder.

For example, when all neighbor blocks A1, B1, B0, A0, and B2 of FIG. 18 use a reference picture identical to a co-located picture, an indicator indicating a block used for determining a temporal motion vector for determining a co-located block may be signaled from the encoder to the decoder. In other words, a motion vector of a neighbor block indicated by the indicator may be used as a temporal motion vector for deriving a co-located block.

Whether or not reference pictures of neighbor blocks are identical with a co-located picture of a current block may be determined on the basis of information on a POC. For example, when POC values are identical, the images may be determined to be identical.

When a current image including a current block and neighbor blocks is a B slice and thus an L0 reference list and an L1 reference list are present, an order of searching for a direction of a reference picture may be determined on the basis of information that is signaled on the basis of at least one of an SPS, a PPS, a slice header, a tile, and a CTU.

For example, based on co-located picture information (collocated_from_l0_flag) signaled in a slice header, an order of searching for a direction so as to determine whether or not an L0 or L1 reference picture of a neighbor block is identical to a co-located picture may be determined.

Herein, co-located picture information (collocated_from_l0_fag) may represent a direction of a reference picture list of a co-located picture including a current block. In an example, when a corresponding flag indicates a first value, it may indicate that a co-located picture is included in an L1 reference picture list. However, when a corresponding flag indicates a second value, it may represent that a co-located picture is included in an L0 reference picture list. In an example, herein, the first value may be "'0", and the second value may be "1". In another example, the first value may be "1", and the second value may be "0".

For example, in determining whether or not a reference picture of an A1 block is identical to a co-located picture of a current block, when co-located picture information (collocated_from_l0_flag) indicates a first value, first, whether or not an L1 reference picture of an A1 block is identical to a co-located picture may be determined. When a reference picture of an A1 block is identical to a co-located picture of a current block, an L1 motion vector of the A1 block may be used as a temporal motion vector so as to determine a position of a co-located block within the co-located picture.

When an L1 reference picture of the A1 block is not identical to a co-located picture, whether or not the co-located picture is identical to a L1 reference picture of a B1 block, to an L1 reference picture of a B0 block, to an L1 reference picture, of an A0 block, and L1 reference picture of a B2 block may be sequentially determined. Meanwhile, when L1 reference pictures of all neighbor blocks are not identical to a co-located picture, from the A1 block to the B2 block, whether or not the co-located picture is identical to an L0 reference picture may be sequentially determined.

For example, in determining whether or not a reference picture of an A1 block is identical to a co-located picture of a current block, when co-located picture information (collocated_from_l0_flag) indicates a first value, first, whether or not an L1 reference picture of an A1 block is identical to a co-located picture may be determined. When an L1 reference picture of an A1 block is not identical to a co-located picture, whether or not a L0 reference picture of the A1 block is identical to the co-located picture may be determined. When an L0 reference picture of an A1 block is identical to the co-located picture, an L0 motion vector of the A1 block may be used as a temporal motion vector so as to determine a position of a co-located block within the co-located picture. Meanwhile, when both L0 and L1 reference pictures are not identical to a co-located picture of a current block, for neighbor blocks B1, B0, A0, and B2 at the subsequent position, whether or not a reference picture and the co-located picture are identical may be determined from an L1 reference picture to an L0 reference picture.

In another example, in determining whether or not a reference picture of an A1 block is identical to a co-located picture of a current block, when co-located picture information (collocated_from_l0_flag) indicates a second value, first, whether or not an L0 reference picture of an A1 block is identical to a co-located picture may be determined. When a reference picture of an A1 block is identical to a co-located picture of a current block, an L0 motion vector of the A1 block may be used as a temporal motion vector so as to determine a position of a co-located block within the co-located picture.

When an L0 reference picture of the A1 block is not identical to a co-located picture, whether or not the co-located picture is identical to an L0 reference picture of a B1 block, to an L0 reference picture of a B0 block, to an L0 reference picture, of an A0 block, and L0 reference picture of a B2 block may be sequentially determined. Meanwhile, when L0 reference pictures of all neighbor blocks are not identical to a co-located picture, from the A1 block to the B2 block, whether or not the co-located picture is identical to an L1 reference picture may be sequentially determined.

In another example, in determining whether or not a reference picture of an A1 block is identical to a co-located picture of a current block, when co-located picture information (collocated_from_l0_flag) indicates a second value, first, whether or not an L0 reference picture of an A1 block is identical to a co-located picture may be determined. When an L0 reference picture of an A1 block is not identical to a co-located picture, whether or not an L1 reference picture of the A1 block is identical to the co-located picture may be determined. When an L1 reference picture of an A1 block is identical to a co-located picture, an L1 motion vector of the A1 block may be used as a temporal motion vector so as to determine a position of a co-located block within the co-located picture. Meanwhile, when both L0 and L1 reference pictures are not identical to a co-located picture of a current block, for neighbor blocks B1, B0, A0, and B2 at the subsequent position, whether or not a reference picture and a co-located picture are identical may be determined from an L0 reference picture to an L1 reference picture.

In another example, in determining whether or not one fixed neighbor block (for example, A1 neighbor block) is identical to a co-located picture of a current block, when co-located picture information (collocatd_from_l0_flag) indicates a first value and difference between POCs of all reference pictures present in an L0 reference picture list and an L1 reference picture list, and the current image are 0, or smaller than 0, first, whether or not an L1 reference picture of the neighbor block is identical to a co-located picture may be determined. When an L1 reference picture of the corresponding neighbor block is identical to a co-located picture of a current block, an L1 motion vector of the corresponding neighbor block may be used as a temporal motion vector so as to determine a position of a co-located block within the co-located picture.

When an L1 reference picture of the corresponding neighbor block is not identical to a co-located picture, whether or not an L0 reference picture of the corresponding neighbor block is identical to the co-located picture may be determined. When a L0 reference picture of a corresponding neighbor block is identical to the co-located picture, an L0 motion vector of the corresponding neighbor block may be used as a temporal motion vector so as to determine a position of a co-located block within the co-located picture. When both L0 and L1 reference pictures of a neighbor block are not identical to a co-located picture, a default motion vector may be used as a temporal motion vector for determining a position of a co-located block.

Meanwhile, when all spatial neighbor blocks are encoded/decoded by using an intra-prediction mode and thus a temporal motion vector is not derived from the neighbor block, a default motion vector may be used as a temporal motion vector so as to determine a position of a co-located block within a co-located picture.

When all spatial neighbor blocks are encoded/decoded by using an intra-prediction mode and thus a temporal motion vector is not derived from the neighbor block, a position of a corresponding block (temporal neighbor block) within a co-located picture may be determined from a predetermined position.

In an example, a position corresponding to the center position (C3) of a current block of FIG. 19 may be determined as a position of a co-located block.

In another example, on the basis of the lower-right position of a current block of FIG. 19, a position corresponding to a position H calculated by adding an offset of +1 sample in horizontal and vertical directions may be determined as a position of a co-located block.

A predetermined position may be determined as a position of a co-located block rather than using a temporal motion vector derived from spatial neighbor blocks.

When using motion vectors of neighbor blocks as a temporal motion vector of a current block, initial motion vectors, on which correction is not performed, of neighbor blocks may be used for determining a position of a co-located block of the current block.

In determining a position of a co-located block of a current block within a co-located picture, a temporal motion vector may be derived for determining a position of a co-located block on the basis of motion information of candidates within a spatial merge candidate list.

In an example, whether or not a co-located picture is used as a reference picture may be determined from the first candidate of a spatial merge candidate list, and a position of a co-located block may be determined by using a motion vector of the candidate that matches first as a temporal motion vector.

In another example, whether or not a reference picture is identical to a co-located picture may be determined from the first candidate of a spatial merge candidate list, and when the reference picture of the corresponding candidate and the co-located picture of the current block are identical, a motion vector of the first candidate may be used as a temporal motion vector so as to determine a position of a co-located block. Meanwhile, when a reference picture of the corresponding candidate and a co-located picture of the current block are not identical, a zero vector may be used as a temporal motion vector, or sub-block-based motion information on the co-located block may be derived.

When N candidates within a spatial merge candidate list have reference pictures identical to a co-located picture, indicator information on a spatial merge candidate used as a temporal motion vector may be signaled from the encoder to the decoder. A motion vector of a candidate indicated by the indicator may be used as a temporal motion vector for deriving a co-located block.

When a current image is a B slice and thus an L0 reference list and an L1 reference list are present, an order of searching for a direction of a reference picture may be determined on the basis of information that is signaled on the basis of at least one of an SPS, a PPS, a slice header, a tile, and a CTU.

For example, in determining whether or not being identical to a co-located picture of a current block, when co-located picture information (collocated_from_l0_flag) indicates a first value, first, whether or not an L1 reference picture of the first candidate is identical to a co-located picture may be determined. When an L1 reference picture of the first candidate is identical to a co-located picture of a current block, an L1 motion vector of the first candidate may be used as a temporal motion vector so as to determine a position of a co-located block.

When an L1 reference picture of the first candidate is not identical to a co-located picture of a current block, whether or not the co-located picture is identical to an L1 reference picture of the second candidate, to an L1 reference picture of the third candidate, to an L1 reference picture of the fourth candidate, etc. may be sequentially determined. Meanwhile, when L1 reference pictures of all candidates are not identical to a co-located picture, whether or not the co-located picture is identical to an L0 reference picture may be determined from the first candidate.

When the first L0 reference picture is not identical to a co-located picture, whether or not the co-located picture is identical to an L0 reference picture of the second candidate, to an L0 reference picture of the third candidate, to an L0 reference picture of the fourth candidate, etc. may be sequentially determined.

Meanwhile, contrary to the above-description, whether or not an L0 reference picture and a co-located picture are identical may be determined first.

In another example, in determining whether or not reference pictures of candidate within a spatial merge candidate list are identical to a co-located picture of a current block, when co-located picture information (collocated_from_l0_flag) indicates a first value, whether or not an L1 reference picture of the first candidate is identical to a co-located picture may be determined. When an L1 reference picture of the first candidate is identical to a co-located picture, an L1 motion vector of the first candidate may be used as a temporal motion vector so as to determine a position of a co-located block.

When an L1 reference picture of the first candidate is not identical to a co-located picture, whether or not an L0 reference picture of the first candidate is identical to the co-located picture may be determined. When an L0 reference picture of the first candidate is identical to the co-located picture, an L0 motion vector of the first candidate may be used as a temporal motion vector so as to determine a position of a co-located block. Meanwhile, when L0 and L1 reference pictures of the first candidate are not identical to a co-located picture, whether or not the co-located picture is identical to a reference picture may be sequentially determined from the first to fourth candidates.

When a current image is a B slice and thus L0 and L1 reference picture lists are present, whether or not a reference picture and a co-located picture are identical may be determined according to a predefined order.

In one example, when a predefined order is defined in an order from an L0 reference picture to an L1 reference picture, first, whether or not an L0 reference picture of the first candidate is identical to a co-located picture may be determined. When an L0 reference picture of the first candidate is identical to a co-located picture of a current block, an L0 motion vector of the first candidate may be used as a temporal motion vector so as to determine a position of a co-located block.

When an L0 reference picture of the first candidate is not identical to a co-located picture of a current block, whether or not the co-located picture is identical to an L0 reference picture of the second candidate, to an L0 reference picture of the third candidate, to an L0 reference picture of the fourth candidate, etc. may be sequentially determined. Meanwhile, when L0 reference pictures of all candidates are not identical to a co-located picture, whether or not the co-located picture is identical to an L1 reference picture may be determined from the first candidate.

In another example, when a predefined order is defined in an order from an L0 reference picture to an L1 reference picture, first, whether or not an L0 reference picture of the first candidate is identical to a co-located picture may be determined. When an L0 reference picture of the first candidate is identical to a co-located picture of a current block, an L0 motion vector of the first candidate may be used as a temporal motion vector so as to determine a position of a co-located block.

When an L0 reference picture of the first candidate is not identical to a co-located picture, whether or not an L1 reference picture is identical to the co-located picture may be determined. When an L1 reference picture of the first candidate is identical to the co-located picture, an L1 motion vector of the first candidate may be used as a temporal motion vector so as to determine a position of a co-located block.

When L0 and L1 reference pictures of the first candidate are not identical to a co-located picture, whether or not the co-located picture is identical to a reference picture may be sequentially determined from the first to fourth candidates in an order of from L0 to L1 reference pictures.

When a current image is a B slice and thus L0 and L1 reference picture lists are present, orders different from each other for performing determination may be applied according to a prediction structure.

In an example, when POCs of all reference pictures are smaller than a POC of a current image, a direction of a reference picture for searching for a reference picture identical to a co-located picture according to corresponding position information (collocated_from_l0_flag) may be determined.

In another example, in case of a prediction structure where a reference picture having a POC greater than a POC of a current image is present, determination may be performed for an L0 reference picture, and then determination for an L1 reference picture may be performed.

In another example, when L0 and L1 reference picture lists are present, a direction of a reference picture for searching for a reference picture identical to a co-located picture according to corresponding position information (collocated_from_l0_flag) may be determined.

When a current image is a B slice and thus L0 and L1 reference picture lists are present, and motion information of one direction is usable from motion information of a neighbor block, whether or not a reference picture is identical to a co-located picture may be determined for the usable direction. When a reference picture is identical to a co-located picture for the usable direction, a motion vector of the corresponding direction may be used as a temporal motion vector so as to determine a position of a co-located block. Meanwhile, when a reference picture is not identical to a co-located picture for the usable direction, a default motion vector may be used as a temporal motion vector so as to determine a position of a co-located block.

When a current image uses a reference picture present in one direction (for example, forward or reverse direction), an order of performing determination may be determined according to a direction of an existing reference picture list.

For example, when a current image is a P slice using only an L0 reference picture, whether or not being identical to a co-located picture may be determined by using only an L0 reference picture list.

Hereinafter, determining a position of a co-located block may be defined as below.

In an example, determining a position of a co-located block may mean, as shown in FIG. 20, determining a position by moving by a temporal motion vector within a co-located picture on the basis of the center position within a current block.

In another example, determining a position of a co-located block may mean, as shown in FIG. 21, determining a position by moving by a temporal motion vector within a co-located picture on the basis of the upper-left position within a current block.

In another example, determining a position of a co-located block may mean, as shown in FIG. 21, determining a position by moving by a temporal motion vector within a co-located picture on the basis of the lower-right position within a current block.

In another example, determining a position of a co-located block may mean, as shown in FIG. 21, determining a position by moving by a temporal motion vector within a co-located picture on the basis of a position calculated by adding an offset of +1 sample in horizontal and vertical direction on the basis of the lower-right position of the current block.

Meanwhile, hereinafter, a co-located block within a co-located picture may be defined as below.

In an example, a co-located block may mean a block having a width and a height identical to those of a current block and in which the center position thereof is calculated by moving by a temporal motion vector within a co-located picture on the basis of the center position (W/2, H/2) within the current block.

In another example, a co-located block may mean a block having a width and a height identical to those of a current block and in which the center position thereof is calculated by moving by a temporal motion vector within a co-located picture on the basis of the upper-left position (0,0) within the current block.

In another example, a co-located block may mean a block having a width and a height identical to those of a current block and in which the center position thereof is calculated by moving by a temporal motion vector within a co-located picture on the basis of the lower-right position (W,H) within the current block.

In another example, a co-located block may mean a block having a width and a height identical to those of a current block and in which the center position thereof is calculated by moving by a temporal motion vector within a co-located picture on the basis of a position (W+1, H+1) calculated by adding an offset of +1 sample in horizontal and vertical direction on the basis of the lower-right position (W, H) of the current block.

In an example, a co-located block may mean a block having a width and a height identical to those of a current block and in which the center position thereof is calculated by moving by a temporal motion vector within a co-located picture on the basis of the center position (W/2, H/2) within the current block.

Hereinafter, a method of deriving a representative motion vector or central motion vector of a current block will be described.

On the basis of a predetermined position of a current block, whether or not to determine sub-block-based motion information on the current block may be determined on the basis of motion information at a position calculated by moving by a temporal motion vector within a co-located picture. Herein, a predetermined position may be one position of the center (W/2, H/2), the upper-left (0,0), the lower-right (W, H), the lower-right (W+1, H+1) of the current block.

On the basis of the center position of a current block, whether or not to determine a sub-block-based motion vector on the current block may be determined on the basis of whether or not motion information at a position calculated by moving by a temporal motion vector within a co-located picture is available.

In an example, when a prediction mode in a corresponding position is an intra-prediction and thus using motion information on the corresponding position is not available, deriving a sub-block-based motion vector on a current block may not be performed.

In another example, when a prediction mode in a corresponding position is an inter-prediction and using motion information on the corresponding position is available, but an reference picture index in the corresponding position indicates an image including the corresponding position, deriving a sub-block-based motion vector on a current block may not be performed. A case where the reference picture index in the corresponding position indicates an image including the corresponding position may mean that the prediction mode in the corresponding position is an IBC mode.

When using motion information in the corresponding position is not available, a sub-block-based motion vector on a current block may be derived by using motion information of the usable adjacent position.

In an example, when motion information at a corresponding position within a co-located picture is not usable, a sub-block-based motion vector may be derived by using motion information at a position calculated by adding/subtracting by a predetermined offset value in a horizontal or vertical direction on the basis of the corresponding position.

Herein, a predetermined offset value may be derived by using a width or height of a current block and a ratio of the width to the height of the current block.

When motion information at a corresponding position is not usable, default motion information may be used. Default motion information may include a zero motion vector having vertical and horizontal directional components of 0, and an L0 and/or L1 reference picture indicator having a value of 0. Herein, an L0 and/or L1 reference picture indicator having a value of 0 may mean that the first reference picture within an L0/L1 reference picture list is used.

In an example, when a current image is a B slice and motion information at a corresponding position is not usable, default motion information may be used. Default motion information may include a zero motion vector having vertical and horizontal directional components of 0, and an L0 reference picture indicator having a value of 0 and an L1 reference picture indicator having a value of −1. A reference picture indicator having a value of −1 may mean that a reference picture in an L1 direction is not used.

In another example, when a current image is a B slice and motion information at a corresponding position is not usable, default motion information may be used. Default motion information may include a zero motion vector having vertical and horizontal directional components of 0, and an L0 reference picture indicator having a value of −1 and an L1 reference picture indicator having a value of 0. A reference picture indicator having a value of −1 may mean that a reference picture in an L0 direction is not used.

In another example, when a current image is a B slice and motion information at a corresponding position is not usable, default motion information may be used. Default motion information may include a zero motion vector having vertical and horizontal directional components of 0, and an L0 reference picture indicator having a value of 0 and an L1 reference picture indicator having a value of 0.

In another example, when a current image is a P slice and motion information at a corresponding position is not usable, default motion information may be used. Default motion information may include a zero motion vector having vertical and horizontal directional components of 0, and an L0 reference picture indicator having a value of 0.

In an example, when motion information at a corresponding position is not usable, motion information at a position indicated by a temporal motion vector calculated by adding a predetermined offset value to a derived temporal motion vector in a horizontal or vertical direction may be used. The offset value may be derived by using a width or height of a current block and a ratio of the width to the height of the current block.

For example, when a motion vector is (3,5) and an offset is 1, motion information at a position indicated by motion vectors of (3,4), (4,5), (3,6), and (2,5) may be derived. Herein, an offset may be a positive integer equal to or greater than 1.

In another example, when motion information at corresponding position is not usable, a sub-block-based motion vector may be derived by using motion information at a position corresponding to the lower-right position (W+1, H+1) of the current block.

In another example, when motion information at corresponding position is not usable, a sub-block-based motion vector may be derived by using motion information at a position corresponding to the center position (W/2, H/2) of the current block.

In another example, when motion information at corresponding position is not usable, a sub-block-based motion vector may be derived by using motion information at a position corresponding to the upper-left position (0,0) of the current block.

In another example, when motion information at corresponding position is not usable, a sub-block-based motion vector may be derived by using motion information at a position corresponding to the lower-right position (W, H) of the current block.

When a prediction mode at a corresponding position is one of an intra-prediction mode, an affine transform model prediction mode, and a prediction mode (IBC mode) referring to a current picture, it may be determined that motion information is not available.

Motion information derived on the basis of motion information at a corresponding position within a co-located picture may be used as a representative motion vector of a current block. A representative motion vector of a current block may be represented as a central motion vector of the current block. In addition, a representative motion vector of a current block may mean motion information of a sub-block including a predetermined sample position of the current block.

In deriving representative motion information, motion information may be derived on the basis of direction information on a reference picture list including a co-located picture.

For example, representative motion information of a current block may be derived as below according to a direction of a reference picture list including a co-located picture.

Figure 22:
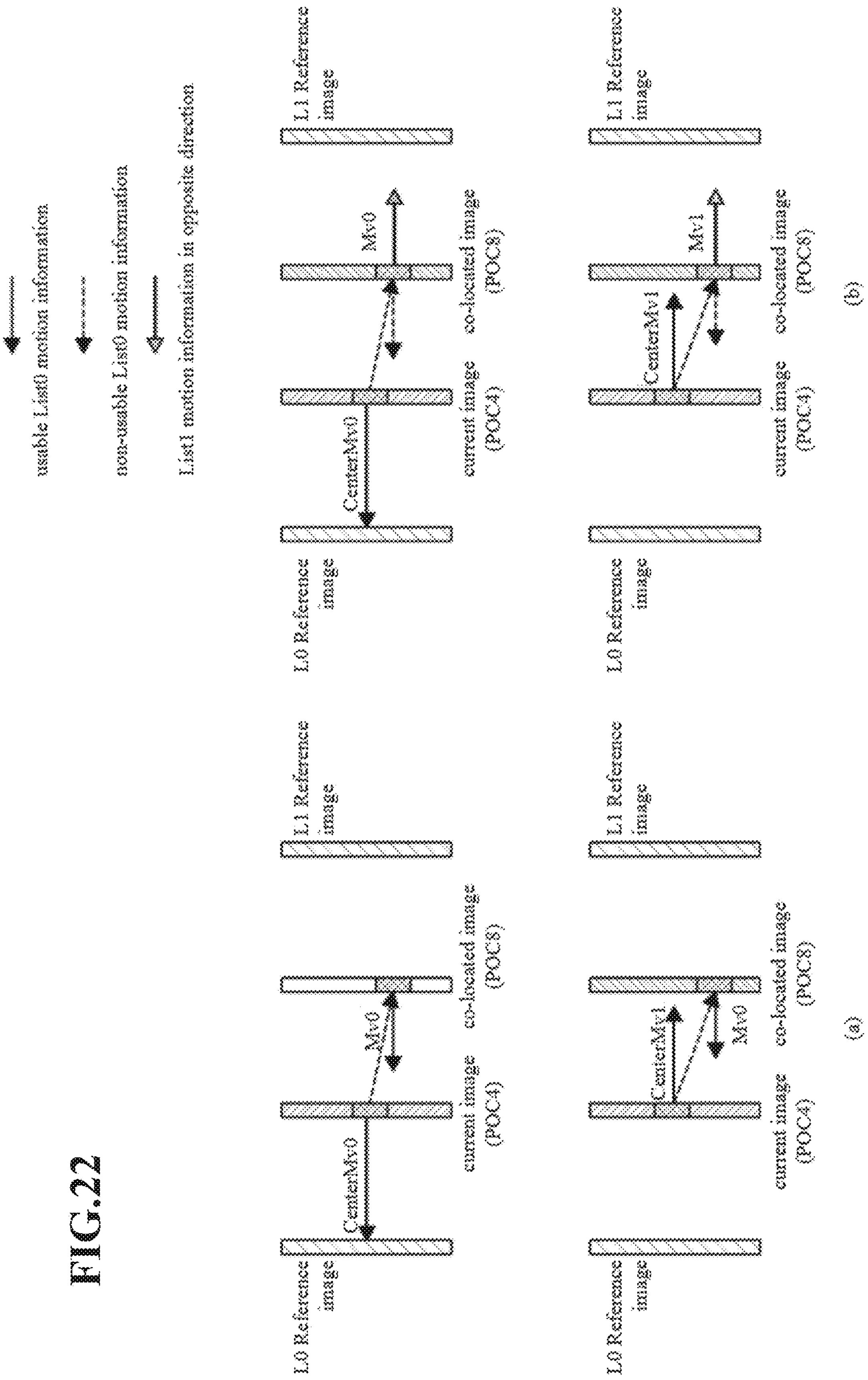
FIGS. 22 and 23 are views respectively showing a method of deriving motion information by using a co-located block.

In an example, when a current image including a current block is a B slice and co-located picture information (collocated_from_l0_flag) is a first value, as shown in FIG. 22(*a*), an L0 representative motion vector and an L1 representative motion vector of the current block may be derived from L0 directional motion information at a co-located block position within the co-located picture indicated by a temporal motion vector. However, as shown in FIG. 22(*b*), when L0 directional motion information is not present, an L0 representative motion vector and an L1 representative motion vector may be derived from L1 directional motion information.

Figure 23:
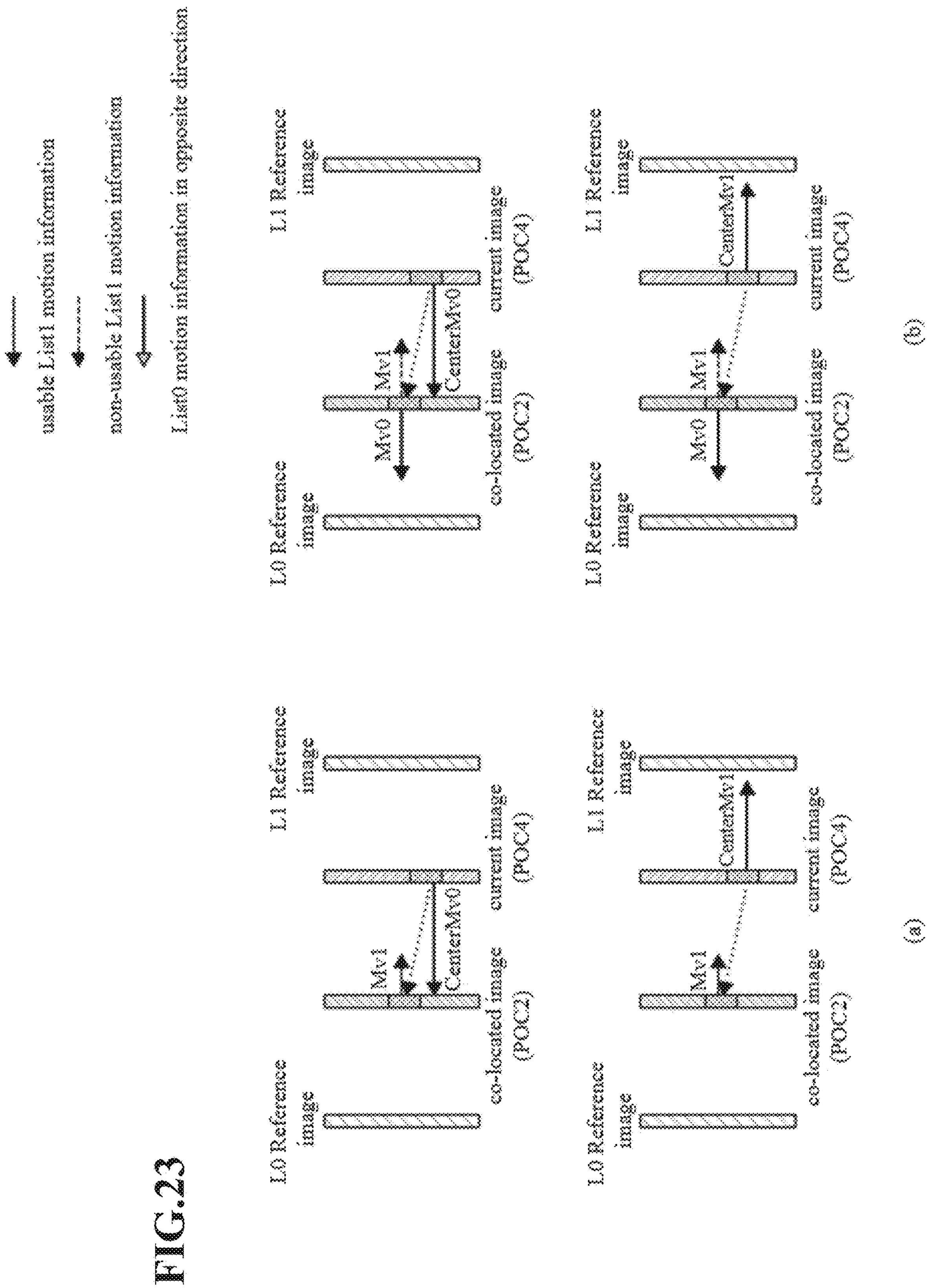

In another example, when a current image including a current block is a B slice and co-located picture information (collocated_from_l0_flag) is a second value, as shown in FIG. 23(*a*), an L0 representative motion vector and an L1 representative motion vector of the current block may be derived from L1 directional motion information at a co-located block position within the co-located picture indicated by a temporal motion vector. However, as shown in FIG. 23(*b*), when L1 directional motion information is not present, an L0 representative motion vector and an L1 representative motion vector may be derived from L0 directional motion information.

In another example, when a current image including a current block is a B slice and L0 directional motion information and L1 directional motion information at a co-located block position within a co-located picture are present, a representative motion vector may be derived as following. When co-located picture information (collocated_from_l0_flag) is a first value, as shown in FIG. 22(*a*), an L0 representative motion vector and an L1 representative motion vector of the current block may be derived from L0 directional motion information at the co-located block position within the co-located picture indicated by a temporal motion vector.

In another example, when a current image including a current block is a B slice and L0 directional motion information and L1 directional motion information at a co-located block position within a co-located picture are present, a representative motion vector may be derived as following. When co-located picture information (collocated_from_l0_flag) is a second value, as shown in FIG. 23(*a*), an L0 representative motion vector and an L1 representative motion vector of the current block may be derived from L1 directional motion information at the co-located block position within the co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in directions different with each other on the basis of the current image, a representative motion vector may be derived as following. When co-located picture information (collocated_from_l0_flag) is a first value, as shown in FIG. 22(*a*), an L0 representative motion vector and an L1 representative motion vector of the current block may be derived from L0 directional motion information at the co-located block position within the co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in directions different with each other on the basis of the current image, a representative motion vector may be derived as following. When co-located picture information (collocated_from_l0_flag) is a second value, as shown in FIG. 23(*a*), an L0 representative motion vector and an L1 representative motion vector of the current block may be derived from L1 directional motion information at the co-located block position within the co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in the same direction on the basis of the current image, a representative motion vector may be derived as following. An L0 representative motion vector of a current block may be derived from L0 motion information at the co-located block position rather than using co-located picture information (collocated_from_l0_flag). In addition, an L1 representative motion vector of the current block may be derived from L1 motion information at the co-located block position rather than using co-located picture information (collocated_from_l0_flag).

In deriving representative motion information, an L0 representative motion vector and an L1 representative motion vector of a current block may be derived according to whether or not L0 directional motion information and L1 directional motion information at a co-located block position are usable.

In an example, when only L1 motion information at a co-located block position is available, L0 representative motion information of the current block may be derived from the usable L1 motion information. The above example may be performed for a case where an L0 reference picture and an L1 reference picture are positioned in the same reference picture list direction on the basis of the current image.

In another example, when only L1 motion information at a co-located block position is available, L1 representative motion information of the current block may be derived from the available L1 motion information.

In another example, when only L0 motion information at a co-located block position is available, L1 representative motion information of the current block may be derived from the available L0 motion information. The above example may be performed for a case where an L0 reference picture and an L1 reference picture are positioned in the same reference picture list direction on the basis of the current image.

In another example, when only L0 motion information at a co-located block position is available, L0 representative motion information of the current block may be derived from the available L0 motion information.

In another example, when L0 and L1 motion information at a co-located block position is usable, and an L0 reference picture and an L1 reference picture are positioned in the same direction on the basis of a current image, an L0 representative motion vector of the current block may be derived from L0 motion information at the co-located block position.

In another example, when L0 and L1 motion information at a co-located block position is usable and an L0 reference picture and an L1 reference picture are positioned in directions different from each other on the basis of a current image, L0 representative motion information and L1 representative motion information of the current block may be derived from motion information at the co-located block position based on co-located picture information (collocated_from_l0_flag).

In another example, when L0 and L1 motion information at a co-located block position is usable and an L0 reference picture and an L1 reference picture are positioned in directions different from each other on the basis of a current image, L0 representative motion information and L1 representative motion information of the current block may be derived as following. When a value of co-located picture information (collocated_from_l0_flag) is a first value, L0/L1 representative motion information of the current block may be derived from L0 motion information of a co-located block.

In another example, when L0 and L1 motion information at a co-located block position is usable and an L0 reference picture and an L1 reference picture are positioned in directions different from each other on the basis of a current image, L0 representative motion information and L1 representative motion information of the current block may be derived as following. When a value of co-located picture information (collocated_from_l0_flag) is a second value, L0/L1 representative motion information of the current block may be derived from L1 motion information of a co-located block.

An L0 directional reference picture and an L1 directional reference picture being positioned in directions different from each other on the basis of a current image may mean that a POC of the L0 directional reference picture has a value smaller than a POC of the current image, and a POC of the L1 directional reference picture has a value greater than the POC of the current image. In addition, an L0 directional reference picture and an L1 directional reference picture being positioned in directions different from each other on the basis of a current image may mean that a POC of the L1 directional reference picture has a value smaller than a POC of the current image and a POC of the L0 directional reference picture has a value greater than the POC of the current image.

An L0 directional reference picture and an L1 directional reference picture being positioned in the same direction on the basis of a current image may mean that both POCs of the L0/L1 reference picture have values smaller than or greater than a POC of the current image.

When a current image including a current block uses a reference picture present in one direction (for example, forward or reverse direction), representative motion information of the current block may be determined according to a direction of an existing reference picture list.

In an example, when a current image including a current block is a P slice, an L0 representative motion vector of the current block may be derived from L0 motion information of a co-located block within a co-located picture present in an L0 list direction.

In deriving representative motion information of a current block, motion information may be derived on the basis of a motion estimation direction at a corresponding position.

Motion information may be derived on the basis of information on a motion estimation direction at a corresponding position.

In an example, when a current image including a current block is a B slice, and L0 directional information is only present as motion information at a corresponding position, representative motion information of the current block may be derived in an L0 direction.

In another example, when a current image including a current block is a B slice, and L1 directional information is only present as motion information at a corresponding position, representative motion information of the current block may be derived in an L1 direction.

In another example, when a current image including a current block is a B slice, and L0 and L1 directional motion information are present at a corresponding position, representative motion information of the current block may be derived in both L0 and L1 directions.

In another example, when a current image including a current block is a B slice, and L0 and L1 directional motion information are present at a corresponding position, representative motion information of the current block may be derived in an L0 direction. For example, the above is for reducing a memory bandwidth.

In another example, when a current image including a current block is a B slice, and L0 and L1 directional motion information are present at a corresponding position, representative motion information of the current block may be derived in an L1 direction. For example, the above is for reducing a memory bandwidth.

In another example, when an L0 reference picture and an L1 reference picture are positioned in the same direction on the basis of a current image, but only L1 directional information is available as motion information at a corresponding position, L0 representative motion information of a current block may be derived from L1 motion information at a corresponding position.

In another example, when an L0 reference picture and an L1 reference picture are positioned in the same direction on the basis of a current image, but only L0 directional information is available as motion information at a corresponding position, L1 representative motion information of a current block may be derived from L0 motion information at a corresponding position.

For representative motion information of a current block, information (ref_idx) on a reference picture may be only used for a fixed predetermined reference picture. Hereinafter, ref_idx may mean an indicator for indicating a reference picture of a current block or a reference picture index.

In an example, ref_idx value may be a positive value including 0. In another example, ref_idx value may be determined as 0 such that a current block uses the first reference picture within an L0 or L1 reference picture list. In another example, ref_idx of a current block may be derived from a neighbor block.

In addition, a ref_idx of a neighbor block from which a temporal motion vector is derived, or a ref_idx value of a spatial merge candidate derived from a temporal motion vector may be used as ref_idx of a current block. In addition, ref_idx of a current block may be derived from information signaled from the encoder.

When a distance between an image including a current block and a reference picture of the current block differs with a distance between an image including a co-located block and a reference picture of the co-located block, motion information at a corresponding position of the current block may be derived by performing scaling on a motion vector of the co-located block within a co-located picture.

In an example, scaling may be performed with reference to the above-described FIG. 14. Performing scaling on a motion vector of a co-located block is identical to the description of FIG. 14, and thus detailed description thereof will be omitted.

Representative motion information may be used as an additional merge candidate. For example, the encoder or decoder may use representative motion information by adding the same as a merge candidate of a current block rather than partitioning the current block on the basis of a sub-block.

In an example, representative motion information derived according to at least one of the above-described methods may be used by replacing with a temporal merge candidate.

In another example, representative motion information derived according to at least one of the above-described methods may be used as a merge candidate with a temporal merge candidate. Herein, whether or not representative motion information and motion information of a temporal merge candidate are identical may be determined, and if not, the representative motion information may be used as an additional temporal merge candidate.

For example, a position of representative motion information within a merge list may be subsequent to a spatial merge candidate. In another example, a position of representative motion information within a merge list may be subsequent to an advanced temporal merge candidate derived by partitioning a current block on the basis of a sub-block, or subsequent to a sub-block-based temporal merge candidate. In another example, a position of representative motion information within a merge list may be subsequent to a temporal merge candidate.

Hereinafter, a method of deriving a sub-block-based motion vector according to an embodiment of the present invention will be described.

As described above, when representative motion information of a current block is derived, the encoder or decoder may derive sub-block-based motion information by partitioning the current block by a predetermined size.

In an example, when partitioning a current block by a predetermined size, the number of sub-blocks within the current block may be determined on the basis of at least one coding parameter of the current block.

In addition, partitioning a current block may be determined according at least one of a coding depth, a size of the sub-block, a size of the current block, and a shape of the current block.

In addition, a sub-block size may be determined according to information on a coding depth of a current image including a current block. For example, when information on a coding depth of a current image indicates the largest depth, a sub-block size may be determined according to a sub-block size indicated by an SPS, a PPS, a slice header, a CTU, a tile, etc. However, when information on a coding depth of a current image indicates coding depth information that is smaller than the largest depth, a sub-block size may have a size greater than a size indicated in a parent level.

For example, a sub-block size of a current block may be determined by information on a sub-block-based motion information usage flag which is indicated in an SPS, a PPS, a slice header, a CTU, a tile, etc. For example, when a corresponding flag value is a first value, a sub-block size may be determined by using transmitted information on a sub-block size. However, when a corresponding flag value is a second value, without performing partition into sub-blocks, a representative motion vector derived from motion information at a corresponding position may be used as a merge candidate of a current block.

In an example, the number of sub-blocks may be determined according to a size of a current block. For example, when a size of a current block is 32×32, the number of sub-blocks may be 16, and when a size of a current block is 64×64, the number of sub-blocks may be 4.

In another example, the number of sub-blocks may be determined according to a shape of a current block. When a current block is 16×32 that is a non-square shape where a height is greater than a width, the number of sub-blocks may be 8. In addition, when a shape of current block is 32×32 that a square, the number of sub-blocks may be 16.

In an example, when a width and a height which are preset in the encoder and the decoder are 8, the number of sub-blocks of a current block may be determined by using Equation 6 below.

$$numSbX = cbWidth \gg 3 \quad \text{[Equation 6]}$$
$$numSbY = cbHeight \gg 3$$
$$sbWidth = 8$$
$$sbHeight = 8$$

Herein, numSbX represents the number of sub-blocks of a current block in a horizontal direction, numSbY represents the number of sub-blocks of the current block in a vertical direction, sbWidth represents a width of the sub-block, sbHeight represents a height of the sub-block, CbWidth represents a width of the current block, and cbHeight represents a height of the current block.

When a width or/and a height of a current block is equal to or smaller than a preset sub-block size or sub-block size indicated in an SPS, s PPS, a slice header, a CTU, a tile, a brick, etc., the current block may not be partitioned into sub-blocks. Herein, derived representative motion information may be added to a merge candidate list. Herein, BIO (bi-directional optical flow)-based motion correction, DMVR (decode-side motion vector refinement)-based motion correction, etc., may be performed for motion information of a corresponding merge candidate by setting a merge type to be identical to a spatial merge candidate (for example, MRG_TYPE_DEFAULT_N) rather than setting to a sub-block type (for example, MRG_TYPE_SUBPU_ATMV).

In an example, when a preset sub-block size is N, and a width of a current block is equal to or smaller than N, or a height is equal to or smaller than N, the encoder or decoder may derive representative motion information of the current block on the basis of motion information at a position indicated by a temporal motion vector, and add the derived information to a merge candidate list rather than partitioning the current block into sub-blocks. Herein, N may be a positive integer equal to or greater than 0.

When a width and a height of a current block are equal to or smaller than a preset sub-block size or sub-block size indicated in an SPS, s PPS, a slice header, a CTU, a tile, a brick, etc., sub-block-based motion information on the current block may not be derived. Not deriving sub-block-based motion information may mean deriving a motion merge candidate (ATMVP) based on a sub-block and not adding the same to a merge candidate list.

When a preset sub-block size is N, and a width of a current block is equal to or smaller than N, and a height is equal to or smaller than N, sub-block-based motion information on the current block may not be derived. Herein, N may be a positive integer equal to or greater than 0.

In an example, when a preset sub-block size is 8, and a width of a current block is equal to or smaller than 8 and a height is equal to or smaller than 8, sub-block-based motion information on the current block may not be derived.

When a width or height of a current block is smaller than a pre-determined sub-block size (for example, a width or height of a sub-block may have an N value. N is a natural number greater than 0) or that a sub-block size indicated in an SPS, a PPS, a slice header, a CTU, a tile, a brick, etc., sub-block-based motion information on the current block may not be derived.

When a width of a current block is smaller than N or a height is smaller than N, sub-block-based motion information on the current block may not be derived.

In an example, when a pre-determined sub-block size is 8, and a width of a current block is smaller than 8 or a height is smaller than 8, sub-block-based motion information on the current block may not be derived.

When a width or/and a height of a current block is equal to or smaller than a predetermined value, sub-block-based motion information on the current block may not be derived. For example, when a width and a height of a current block are equal to or smaller 8, sub-block-based motion information on the current block may not be derived.

When a width or/and a height of a current block is smaller than a predetermined value, sub-block-based motion information on the current block may not be derived. For example, when a width or height of a current block is smaller 8, sub-block-based motion information on the current block may not be derived.

A shape of a sub-block within a current block may be fixed in a square shape regardless of a shape of the current block.

In addition, a shape of a sub-block within the current block may be determined to be identical to a shape of the current block. For example, when a current block is a non-square where a height is greater than a width, a shape of a sub-block may be determined as a non-square where a height is greater than a width. For example, when a width of a current block is 4 and a height is 32, and a preset sub-block size is 8, the current block may be partitioned into sub-blocks having a width of 4 and a height of 8. In other words, the current block may be partitioned into four sub-blocks having a size of a 4×8 sub-block.

After partitioning a current block on the basis of a sub-block, motion information of a corresponding sub-block may be derived on the basis of motion information at a position that is determined by determining a co-located block position within a co-located picture for each sub-block.

In deriving motion information, motion information may be derived on the basis of information on a reference picture list direction including a co-located picture.

In other words, motion information of a current block may be derived as below according to a direction of a reference picture list including a co-located picture.

In an example, when a current image including a current block is a B slice and co-located picture information (collocated_from_l0_flag) is a first value, as shown in FIG. 22(*a*), an L0 motion vector and an L1 motion vector of a sub-block may be derived from L0 directional motion information at a co-located block position within a co-located picture indicated by a temporal motion vector. However, when L0 directional motion information is not present as shown in FIG. 22(*b*), an L0 motion vector and an L1 motion vector may be derived from L1 directional motion information.

In another example, when a current image including a current block is a B slice and co-located picture information (collocated_from_l0_flag) is a second value, as shown in FIG. 23(*a*), an L0 motion vector and an L1 motion vector of the sub-lock may be derived from L1 directional motion information at a co-located block position within a co-located picture indicated by a temporal motion vector. However, when L1 directional motion information is not present as shown in FIG. 23(*b*), an L0 motion vector and an L1 motion vector may be derived from L0 directional motion information.

In another example, when a current image including a current block is a B slice and L0 directional motion information and L1 directional motion information at a co-located block position within a co-located picture are present, a motion vector of a sub-block may be derived as following. When co-located picture information (collocated_from_l0_flag) is a first value, as shown in FIG. 22(*a*), an L0 motion vector and an L1 motion vector of a sub-block may be derived from L0 directional motion information at a co-located block position within a co-located picture indicated by a temporal motion vector.

In another example, when a current image including a current block is a B slice and L0 directional motion information and L1 directional motion information at a co-located block position within a co-located picture are present, a motion vector of a sub-block may be derived as following. When co-located picture information (collocated_from_l0_flag) is a second value, as shown in FIG. 23(*a*), an L0 motion vector and an L1 motion vector of a sub-block may be derived from L1 directional motion information at a co-located block position within a co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in directions different with each other on the basis of the current image, a motion vector of a sub-block may be derived as following. When co-located picture information (collocated_from_l0_flag) is a first value, as shown in FIG. 22(*a*), an L0 motion vector and an L1 motion vector of a sub-block may be derived from L0 directional motion information at a co-located block position within a co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in directions different with each other on the basis of the current image, a motion vector of a sub-block may be derived as following. When co-located picture information (collocated_from_l0_flag) is a second value, as shown in FIG. 23(*a*), an L0 motion vector and an L1 motion vector of a sub-block may be derived from L1 directional motion information at a co-located block position within a co-located picture indicated by a temporal motion vector.

In another example, when a current image including a current block is a B slice, L0 directional motion information and L1 directional motion information at a co-located block position within a co-located picture are present, and an L0 directional reference picture and an L1 directional reference picture are positioned in the same direction on the basis of the current image, a motion vector of a sub-block may be derived as following. An L0 motion vector of a sub-block may be derived from L0 motion information at a co-located block position rather than using co-located picture information (collocated_from_l0_flag). In addition, an L1 motion vector of a sub-block may be derived from L1 motion information at a co-located block position rather than using co-located picture information (collocated_from_l0_flag).

In deriving motion information, an L0 motion vector and an L1 motion vector of a sub-block may be derived according to whether or not L0 directional motion information and L1 directional motion information at a co-located block position are usable.

In an example, when only L1 motion information at a co-located block position is usable, L0 motion information of a sub-block may be derived from the usable L1 motion information. The above example may be performed for a case where an L0 reference picture and an L1 reference picture is positioned at the same direction on the basis of the current image.

In another example, when only L1 motion information at a co-located block position is usable, L1 motion information of the sub-block may be derived from the usable L1 motion information.

In another example, when only L0 motion information at a co-located block position is usable, L1 motion information of the sub-block may be derived from the usable L0 motion information. The above example may be performed for a case where an L0 reference picture and an L1 reference picture is positioned at the same direction on the basis of the current image.

In another example, when L0 motion information at a co-located block position is only usable, L0 motion information of the sub-block may be derived from the usable L0 motion information.

In another example, when L0 and L1 motion information at a co-located block position is usable, and an L0 reference picture and an L1 reference picture are positioned in the same direction on the basis of a current image, an L0 motion vector of the sub-block may be derived from L0 motion information at the co-located block position.

In another example, when L0 and L1 motion information at a co-located block position is usable and an L0 reference picture and an L1 reference picture are positioned in directions different from each other on the basis of a current image, L0 motion information and L1 motion information of a sub-block may be derived from motion information at the co-located block position based on co-located picture information (collocated_from_l0_flag).

In another example, when L0 and L1 motion information at a co-located block position is usable and an L0 reference picture and an L1 reference picture are positioned in directions different from each other on the basis of a current image, L0 motion information and L1 motion information of a sub-block may be derived as following. When a value of co-located picture information (collocated_from_l0_flag) is a first value, L0/L1 motion information of a sub-block may be derived from L0 motion information of a co-located block.

In another example, when L0 and L1 motion information at a co-located block position is usable and an L0 reference picture and an L1 reference picture are positioned in directions different from each other on the basis of a current image, L0 motion information and L1 motion information of a sub-block may be derived as following. When a value of co-located picture information (collocated_from_l0_flag) is a second value, L0/L1 representative motion information of a current block may be derived from L1 motion information of a co-located block.

In another example, when a current image including a current block is a P slice, an L0 motion vector of a sub-block may be derived from L0 motion information of a co-located block within a co-located picture present in an L0 list direction.

In deriving motion information of a sub-block, motion information may be derived on the basis of a motion estimation direction at a corresponding position.

Motion information may be derived on the basis of information on a motion estimation direction at a corresponding position.

In an example, when a current image including a current block is a B slice and L0 directional information is only present as motion information at a corresponding position, representative motion information of the current block may be derived in an L0 direction.

In another example, when a current image including a current block is a B slice and L1 directional information is only present as motion information at a corresponding position, motion information of a sub-block may be derived in an L1 direction.

In another example, when a current image including a current block is a B slice and L0 and L1 directional motion information is present at a corresponding position, motion information of a sub-block may be derived in both L0 and L1 directions.

In another example, when a current image including a current block is a B slice and L0 and L1 directional motion information is present at a corresponding position, motion information of a sub-block may be derived in an L0 direction. For example, the above is for reducing a memory bandwidth.

In another example, when a current image including a current block is a B slice and L0 and L1 directional motion information is present at a corresponding position, motion information of a sub-block may be derived in an L1 direction. For example, the above is for reducing a memory bandwidth.

In another example, when an L0 reference picture and an L1 reference picture are positioned in the same direction on the basis of a current image, but only L1 directional information is usable as motion information at a corresponding position, L0 motion information of a sub-block may be derived from L1 motion information at a corresponding position.

In another example, when an L0 reference picture and an L1 reference picture are positioned in the same direction on the basis of a current image, but only L0 directional information is usable as motion information at a corresponding position, L1 motion information of a sub-block may be derived from L0 motion information at a corresponding position.

When a current image including a current block is a B slice and L0 and L1 motion information derived from a corresponding position is usable, motion information of a sub-block may be derived in one of L0 and L1 directions. Motion information being derived in one of L0 and L1 directions may mean that an inter-prediction indicator of a corresponding sub-block is set to one direction (L0 prediction or L1 prediction). Examples below may be for reducing a memory bandwidth.

For example, when a width of a resulting sub-block is N and a height is M, motion information of the sub-block may be derived in one of L0 and L1 directions. In other words, uni-directional prediction may be performed on the corresponding sub-block. Herein, N and M may be a natural number greater than 0.

In an example, when a width of a resulting sub-block is 4 and a height is 4, L0 motion information may be derived for the sub-block. In other words, L0 uni-directional prediction may be performed on the 4×4 sub-block.

In another example, when a width of a resulting sub-block is 4 and a height is 8, L0 motion information may be derived for the sub-block. In other words, L0 uni-directional prediction may be performed on the 4×8 sub-block.

In another example, when a width of a resulting sub-block is 8 and a height is 4, L0 motion information may be derived for the sub-block. In other words, L0 uni-directional prediction may be performed on the 8×4 sub-block.

In another example, when a width of a resulting sub-block is 8 and a height is 8, L0 motion information may be derived for the sub-block. In other words, L0 uni-directional prediction may be performed on the corresponding sub-block.

In another example, when a width of a resulting sub-block is 4 and a height is 4, L1 motion information may be derived for the sub-block. In other words, L1 uni-directional prediction may be performed on the 4×4 sub-block.

In another example, when a width of a resulting sub-block is 4 and a height is 8, L1 motion information may be derived for the sub-block. In other words, L1 uni-directional prediction may be performed on the 4×8 sub-block.

In another example, when a width of a resulting sub-block is 8 and a height is 4, L1 motion information may be derived for the sub-block. In other words, L1 uni-directional prediction may be performed on the 8×4 sub-block.

In another example, when a width of a resulting sub-block is 8 and a height is 8, L1 motion information may be derived for the sub-block. In other words, L1 uni-directional prediction may be performed on the corresponding sub-block.

When motion information at a position associated with a sub-block is not usable, representative motion information of a current block may be used as motion information of the corresponding sub-block.

In an example, when a distance between an image including a current sub-block and a reference picture of the current sub-block differs with a distance between an image including a co-located block of the sub-block and a reference picture of the co-located block, motion information at a position corresponding to the current block may be derived by performing scaling on a motion vector at a position of the co-located block within the co-located picture.

When a distance between an image including a current sub-block and a reference picture of the current sub-block differs with a distance between an image including a co-located block of the sub-block and a reference picture of the co-located block, scaling may not be performed, and representative motion information of a current block may be used as motion information of the corresponding sub-block.

When a distance between an image including a current sub-block and a reference picture of the current sub-block differs with a distance between an image including a co-located block of the sub-block and a reference picture of the co-located block, scaling may not be performed, and motion information of a sub-block which is previously derived may be used as motion information of the corresponding sub-block.

Sub-block-based motion information determined by using at least one of sub-block-based motion information deriving methods may be included in a merge candidate list as a merge candidate. Herein, in order to indicate usage of the determined sub-block-based motion information, a merge index may be used.

Sub-block-based motion information may be included in a merge candidate list by using at least one or combination of the following.

In an example, in FIG. 19, a spatial merge candidate list may be configured in an order of A1, B1, B0, and A0, and then sub-block-based motion information may be added. Whether or not to configure a spatial merge candidate list from a B2 block may be determined according to whether or not to derive sub-block-based motion information. For example, when sub-block-based motion information is usable, the number of spatial merge candidates derived from the neighbor is smaller than four, and motion information of a B2 block is usable, the motion information of the B2 block may be added to a merge candidate list.

In another example, in FIG. 19, a spatial merge candidate list may be configured in an order of A1, B1, B0, and A0, and then sub-block-based motion information may be added. When at least one of neighbor blocks A1, B1, B0, and A0 of a current block is not present within a list and motion information of a B2 block is usable, the motion information of the B2 block may be added to a merge candidate list.

In another example, in FIG. 19, a spatial merge candidate list may be configured in an order of A1, B1, B0, and A0, and then sub-block-based motion information may be added. Whether or not to configure a spatial merge candidate list from a B2 block may be determined according to whether or not to use sub-block-based motion information. For example, when an indicator indicating that sub-block-based motion information is used is signaled in an SPS, the number of merge candidate before a B2 block is smaller than five, and motion information of the B2 block is usable, the motion information of the B2 block may be added to a merge candidate list.

In another example, in FIG. 19, a spatial merge candidate list may be configured in an order of A1, B1, B0, and A0, and then sub-block-based motion information may be added. Subsequently, a spatial merge candidate of a B2 block may be added to a candidate list.

In configuring a spatial merge candidate list, the encoder or decoder may determine whether or not to add to the list by performing redundancy checking between all candidates of the merge candidate list. For example, when merge candidates derived from A1, B1, and B0 are present in a merge candidate list, and A0 is usable, redundancy checking may be performed between motion information of the A0 with all candidates present in the list. When redundant motion information is not present, motion information derived from the A0 may be added to the merge candidate list.

The encoder or decoder may add a spatial merge candidate and a sub-block-based motion candidate to a merge candidate list, and then add a temporal merge candidate to the merge candidate list. Herein, redundancy checking between representative motion information of the sub-block-based motion information candidate and motion information of the temporal merge candidate may be performed. When redundant motion information is not present, the temporal merge candidate may be added to the merge candidate list.

In an example, when representative motion information of a sub-block-based motion candidate is L0 directional prediction, and a temporal merge candidate is bi-directional prediction, it may be determined that the sub-block-based motion information candidate and the temporal merge candidate are not identical.

In another example, even when a prediction direction of representative motion information of a sub-block-based motion candidate is identical to a prediction direction of a temporal merge candidate, it may be determined that the sub-block-based motion information candidate and the temporal merge candidate are not identical when motion information of one direction is different. The motion information may mean a motion vector or/and a reference picture index.

When a temporal merge candidate is added to a merge candidate list, redundancy checking between a temporal merge candidate with all spatial candidates present in the merge candidate list may be performed. When redundant motion information is not present, the temporal merge candidate may be added to the merge candidate list.

A spatial merge candidate and a sub-block-based motion candidate may be added to a merge candidate list, and then a temporal merge candidate may be added to the merge candidate list. Herein, a temporal merge candidate may be added to the merge candidate list without performing redundancy checking between representative motion information of the sub-block-based motion candidate and the temporal merge candidate.

When a sub-block-based motion candidate is usable, representative motion information of the sub-block-based motion candidate may be used as a temporal merge candidate in place of a temporal merge candidate.

Only when a sub-block-based motion candidate is not usable, a temporal merge candidate may be added to a merge candidate list.

After adding a temporal merge candidate to a merge candidate list, a sub-block-based motion candidate may be added to the merge candidate list by using one of the above-described methods.

In addition, in order to indicate usage of sub-block-based motion information, additional coding information may be used. Herein, the coding information may be a flag or index information signaled from the encoder to the decoder.

In an example, whether or not to use sub-block-based motion information may be indicated by using a sub-block merge flag. When a value of a sub-block merge flag has a first value, it may be indicated that a current block is encoded by using sub-block-based motion information. However, when a value of a sub-block merge flag has a second value, it may be indicated that a current block is not encoded by using sub-block-based motion information. The above-described flag information may be present when a decoding target block has a width and a height being equal to or greater than M. For example, M may be 8.

The sub-block-based motion information may be stored in motion information based on a sub-block, and used for inter-prediction of an encoding/decoding block afterwards.

In addition, whether or not to perform at least one of adaptive sample offset, deblocking filtering, and adaptive loop filtering may be determined according to the sub-block-based motion information.

When a sub-block-based motion candidate is derived for a current block, or when an affine mode is applied, deblocking filtering may be additionally performed on the current block. Deblocking filtering on a current block may be performed on vertical and horizontal boundaries of a sub-block. In an example, deblocking filtering may be performed on vertical and horizontal boundaries of sub-blocks of a current block where 8×8 grids overlap.

In another example, deblocking filtering may be performed on vertical and horizontal boundaries of sub-blocks of a current block where 4×4 grids overlap. For example, for vertical and horizontal boundaries of sub-blocks of a current block where 4×4 grids overlap, deblocking filtering may be performed on an adjacent pixel based on the boundary.

Deblocking filtering on a sub-block boundary may be for improving blocking artifact occurring due to differences between motion vectors of sub-blocks and a reference picture.

In deriving motion information based on a sub-block by partitioning a current block into sub-blocks, motion information of a reconstructed co-located block of a reference picture temporally adjacent to a current block may be used. Herein, a reference picture temporally adjacent to a current block may mean a co-located picture (co-located image). Herein, deriving sub-block-based motion information on a current block may mean deriving an advanced temporal merge candidate or a sub-block-based temporal merge candidate, and adding to a merge candidate list.

In deriving sub-block-based motion information by partitioning a current block on the basis of a sub-block, sub-block-based motion information may be derived on the basis of an affine transform model, and the derived motion information may be added to a merge candidate list.

Herein, the merge candidate list may mean an affine merge list based on an affine transform model.

In addition, a merge candidate list may mean a sub-block-based motion information merge list.

In addition, an affine merge list may mean a sub-block-based merge list.

Figure 24:
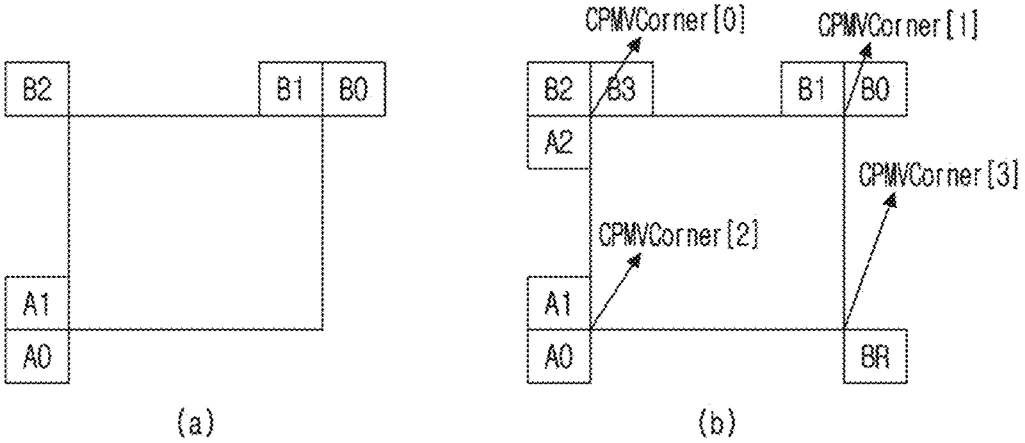
FIG. 24 is a view showing a method of deriving an affine merge candidate according to an embodiment of the present invention.

FIG. 24 is a view showing a method of deriving an affine merge candidate according to an embodiment of the present invention.

An affine merge list may be configured with at least one of a sub-block-base partitioned temporal motion information candidate, a motion information candidate derived by using a CPMV (control point motion vector) of a block encoded by using an affine transform model among neighbor blocks adjacent to a current block, and motion information candidates of neighbor blocks adjacent to the current block for deriving a CPMV of an affine transform model of the current block.

A motion information candidate derived by using a CPMV of a block encoded by using an affine transform model among neighbor blocks adjacent to a current block may be represented as an inherited affine merge candidate. For example, an inherited affine merge candidate may be derived as below.

In a neighbor block A0 shown in FIG. 24(*a*), whether or not to perform encoding based on an affine transform model may be determined from an A1. When the corresponding block is encoded based on affine transform model, a CPMV of a current block may be derived from a CPMV of the corresponding block.

Subsequently, in an order of neighbor blocks B0, B1, and B2 shown in FIG. 24(*a*), whether or not to perform encoding based on an affine transform model may be determined. When the corresponding block is encoded based on affine transform model, a CPMV of a current block may be derived from a CPMV of the corresponding block.

Up to two CPMV prediction candidates may be derived from neighbor blocks by generating one CPMV prediction candidate from the left A0 and A1 blocks and one CPMV prediction candidate from the upper B0, B1, B2 and B3 blocks.

In order to derive a CPMV of an affine transform model of a current block, a candidate derived from motion information of neighbor blocks adjacent to the current block may be represented as a constructed affine merge candidate (constructed affine merge). For example, a constructed affine merge candidate may be derived as below.

In an order of neighbor blocks B2, B3, and A2 shown in FIG. 24(*b*), the first block where motion information thereof is usable may be determined. Herein, motion information of the determined block may be used as the first candidate (CPMVCorner[0]) constituting a CPMV of a current block.

Subsequently, in an order of neighbor blocks B1 and B0 shown in FIG. 24(*b*), the first block where motion information thereof is usable may be determined. Herein, motion information of the determined block may be used as the second candidate (CPMVCorner[1]) constituting the CPMV of the current block.

Subsequently, in an order of neighbor blocks A1 and A0 shown in FIG. 24(*b*), the first block where motion information thereof is usable may be determined. Herein, motion information of the determined block may be used as the third candidate (CPMVCorner[2]) constituting the CPMV of the current block.

Subsequently, a co-located block of a temporal reference picture associated with a BR position shown in FIG. 24(*b*) may be determined. Herein, motion information of the determined block may be used as the fourth candidate (CPMVCorner[3] constituting the CPMV of the current block.

As described above, CPMV motion information candidates of the current block may be derived by using derived motion information (CPMVCorner[0], CPMVCorner[1], CPMVCorner[2], CPMVCorner[3]) of up to four neighbor blocks. In an example, up to six CPMV motion information candidates may be derived for a current block. For example, six CPMV motion information candidates may be derived as Equation 7 below.

$$\{CPMVCorner[0], CPMVCorner[1], CPMVCorner[2]\} \quad \text{[Equation 7]}$$

$$\{CPMVCorner[0], CPMVCorner[1], CPMVCorner[3]\}$$

$$\{CPMVCorner[0], CPMVCorner[2], CPMVCorner[3]\}$$

$$\{CPMVCorner[1], CPMVCorner[2], CPMVCorner[3]\}$$

$$\{CPMVCorner[0], CPMVCorner[1]\}$$

$$\{CPMVCorner[0], CPMVCorner[2]\}$$

In configuring an affine merge list, at least one of a sub-block-base partitioned temporal motion information candidate, an inherited affine merge candidate, and constructed affine merge candidate candidates may be included according to information transmitted in a parent level such as an SPS (sequence parameter sets), a PPS (picture parameter sets), an APS (adaptation parameter set), a sub-picture, a slice header, a tile group, a brick, etc.

In an example, when sps_sbtmvp_enabled_flag transmitted in an SPS is "1" that is a second value, and sps_affine_enabled_flag is "1" that is a second value, in configuring an affine merge list, an affine merge list may be configured by using a sub-block-base partitioned temporal motion information candidate, an inherited affine merge candidate, and constructed affine merge candidate candidates.

In another example, when sps_sbtmvp_enabled_flag transmitted in an SPS is "0" that is a first value, and sps_affine_enabled_flag is "1" that is a second value, in configuring the affine merge list, an affine merge list may be configured by using an inherited affine merge candidate, and constructed affine merge candidate candidates and without including a sub-block-base partitioned temporal motion information candidate.

In another example, when sps_sbtmvp_enabled_flag transmitted in an SPS is "1" that is a second value, and sps_affine_enabled_flag is "0" that is a first value, an affine merge list may be configured by only using a sub-block-base partitioned temporal motion information candidate.

In the above example, the first value may be set to 1, and the second value may be set to 0.

In configuring an affine merge list, information on the maximum number of candidates included in a list may be transmitted in a level of an SPS, a PPS, an APS, a sub-picture, a slice header, a tile group, a brick, etc.

In an example, information indicating the maximum number of candidates included in a list (for example, five_minus_max_num_subblock_merge_cand) may be entropy decoded in a slice header.

The maximum number of candidates included in an affine merge list may be derived from information indicating the maximum number of candidates included in a list (for example, five_minus_max_num_subblock_merge_cand) according to Equation 8 below.

$$\text{Maximum number of candidates } (\text{Max}\mathit{NumSubblockMergeCand}) = 5 - \text{five\_minus\_max\_num\_subblock\_merge\_cand} \quad \text{[Equation 8]}$$

In an example, when sps_affine_enabled_flag decoded in an SPS is "0" that is a first value, and sps_sbtmvp_enabled_flag is "1" that is a second value, the maximum number of candidates (MaxNumSubblockMergeCand) included in an affine merge list may be estimated or determined as "1".

In another example, when sps_affine_enabled_flag decoded in an SPS is "0" that is a first value, and sps_sbtmvp_enabled_flag is "1" that is a second value, the maximum number of candidates (MaxNumSubblockMergeCand) included in an affine merge list may be estimated or determined as "0" when slice_temporal_mvp_enabled_flag decoded in a slice header is "0" that is a first value.

In another example, when sps_affine_enable_flag decoded in an SPS is "0" that is a first value, and sps_sbtmvp_enabled_flag is "1" that is a second value, the maximum number of candidates (MaxNumSubblockMergeCand) included in an affine merge list may be estimated or determined as "1" when slice_temporal_mvp_enabled_flag decoded in a slice header is "1" that is a first value. In the above example, the first value may be set to 1, and the second value may be set to 0.

In configuring an affine merge list, for the maximum number of candidates included in a list, a fixed N value predefined in the encoder and the decoder may be used. Herein, N may be a positive integer including 0. Meanwhile, the maximum number of candidates included in a list being "0" may mean that an affine merge list, and a sub-block-based merge list are not configured.

In configuring an affine merge list, preset motion information may be used when the number of candidates of an affine merge list does not satisfy the maximum number of candidates.

In an example, when sps_sbtmvp_enabled_flag decoded in an SPS is "1" that is a second value, and sps_affine_enabled_flag is "1" that is a second value, an affine merge list may be configured in an order below.

1) A sub-block-base partitioned temporal motion information candidate
2) Up to two inherited affine merge candidates
3) Up to six constructed affine merge candidates In another example, when the number of candidates within an affine merge list is smaller than the maximum available number of candidates, a candidate having a zero (0,0) motion vector and a reference picture indicator value of "j" may be included until the number of candidates becomes identical to the maximum available number of candidates.

In using a (0,0) motion vector and a reference picture indicator value of "j", three CPMVs may be set to have a (0,0) motion vector and a reference picture indicator value of "j" when sps_affine_enabled_flag decoded in an SPS is "1" that is a second value. In addition, the corresponding candidate may be set as a 4-parameter affine model candidate using two CPMVs or 6-parameter affine model candidate using three CPMVs.

A 4-parameter affine model candidate may have a value of MotionModelIdc being "1". The 6-parameter affine model candidate may have a value of MotionModelIdc being "2". When a current block is a B slice, a (0,0) motion vector and a reference picture indicator value of "j" may be set for L0 and L1 directions.

In using a (0,0) motion vector and a reference picture indicator value of "j", motion information of a block that is partitioned on the basis of a sub-block may be set as (0,0) and a reference picture indicator value of "j" when sps_affine_enabled_flag decoded in an SPS is "0" that is a first value. In addition, the corresponding candidate may be set as a translation model-based candidate in place of an affine transform model. The translation model-based candidate may have a value of MotionModelIdc being "0". When a current block is a B slice, a (0,0) motion vector and a reference picture indicator value of "j" may be set for L0 and L1 directions.

In the above example, the first value may be set to 1, and the second value may be set to 0.

Herein, a reference picture indicator value of "j" may have a value below for L0 and L1 reference directions.

1) Being equal to or greater than 0, and equal to or smaller than (the number of L0 reference pictures−1)
2) Being equal to or greater than 0, and equal to or smaller than (the number of L1 reference pictures−1)

3) An initial value being 0, and having a value increasing by 1 every time being added to a list. N is a positive integer greater than 0 (for example, N=1).

4) Always having a value of 0

In another example, when sps_sbtmvp_enabled_flag decoded in an SPS is "1" that is a second value, and sps_affine_enabled_flag is "0" that is a first value (that is, configuring a list by using a sub-block-base partitioned temporal motion information candidate), and the number of candidates within the list is smaller than the maximum available number, an additional candidate may be configured as below, and added to the list.

Herein, the maximum available number of candidates within a list may be 1.

In configuring a temporal motion information candidate partitioned on the basis of a sub-block according to motion information at a position moved within a co-located picture by a temporal motion vector derived from motion information of a neighbor block on the basis of a predetermined sample position of a current block, sub-block-based motion information may be determined as below when motion information at a position moved by a temporal motion vector within a co-located picture on the basis of the center sample position of the current block is not usable.

When motion information is not usable and thus a temporal motion information candidate partitioned on the basis of a sub-block is not configured and the maximum available number of candidates is not satisfied, representative (central) motion information at a position moved within a co-located picture may be set as a (0,0) motion vector and a reference picture indicator value of "0". Subsequently, motion information of all resulting sub-block of N×M (N and M being a positive integer value greater than 0, for example, 8×8) may be set as representative (central) motion information so as to configure a list.

In configuring a sub-block-base partitioned temporal motion information candidate according to motion information at a position moved within a co-located picture by a temporal motion vector derived from motion information of a neighbor block on the basis of a predetermined sample position of a current block, sub-block-based motion information may be determined as below when motion information at a position moved by a temporal motion vector within a co-located picture on the basis of the center sample position of the current block is not usable.

When motion information is not usable, and thus a sub-block-base partitioned temporal motion information candidate is not configured and the maximum available number of candidates is not satisfied, representative (central) motion information at a position moved within a co-located picture may be set as a (0,0) motion vector and a reference picture indicator value of "0". Subsequently, when motion information at a position associated with a resulting sub-block of N×M (N and M being a positive integer value greater than 0, for example, 8×8) is not usable, the set representative (central) motion information may be used as motion information of the corresponding sub-block.

In setting representative (central) motion information as a (0,0) motion vector and a reference picture indicator value of "0", a (0,0) motion vector and a reference picture indicator value of "0" may be set in an L0 reference direction and an L1 reference direction when a current block is a B slice.

In setting representative (central) motion information as a (0,0) motion vector and a reference picture indicator value of "0", a (0,0) motion vector and a reference picture indicator value of "0" may be set in an L0 reference direction when a current block is a B slice. A (0,0) motion vector and a reference picture indicator value of "−1" may be set in an L1 reference direction. Herein, a reference picture indicator value of "−1" may mean that reference is not performed in an L1 direction.

Herein, a case where motion information is not usable may mean a case where a current block or sub-block is encoded through an intra-prediction mode or IBC mode (intra-block copy-based mode).

When a width or height of a current block is equal to or greater than a preset size, a sub-block-based motion information candidate may be derived and added to an affine merge list.

For example, when a width and a height of a current block is equal to or greater than 8, a sub-block-based motion information candidate may be derived and added to an affine merge list.

In an example, when a width and a height of a current block are equal to or greater than 8, and an affine flag value of the current block is a first value, an affine merge list may be configured by deriving at least one of sub-block-based temporal merge candidates including: a candidate using motion information of a reconstructed co-located block of a reference picture temporally adjacent to a current block; a motion candidate derived by a CPMV of a block encoded by using an affine transform model among neighbor blocks adjacent to the current block; and motion information candidates of neighbor blocks adjacent to the current block for deriving an CPMV of an affine transform model of the current block.

In another example, when a width and a height of a current block are equal to or greater than 8, a sub-block-based motion information candidate may be derived and added to an affine merge list.

In another example, when a width and a height of a current block are equal to or greater than 16 a sub-block-based motion information candidate may be derived and added to an affine merge list.

For example, in configuring a merge list by deriving sub-block-based motion information, when a width and a height of a current block are 8, a motion information (ATMVP) candidate of a reconstructed co-located block of a reference picture temporally adjacent to the current block may be only used. In addition, when a width and a height of a current block are equal to or greater than 16, a merge list may be configured by using all of an ATMVP candidate, an inherited affine merge candidate, and a constructed affine merge candidate. In configuring a merge candidate list for a sub-block, sub-block-based motion information on a current block may be derived, and when a width and a height are 8, information on a merge candidate indicator may not be parsed.

In an example, an affine flag value may be a first value or second value. The affine flag may be represented as a sub-block merge flag. An affine flag according to each value may indicate below description.

When an affine flag value is a first value, the affine flag may indicate that encoding/decoding based on a temporal sub-block, and a 4-parameter or 6-parameter affine transform model is applied to a current block.

However, when an affine flag value is a second value, the affine flag may indicate that encoding/decoding based on a temporal sub-block and an affine transform model is not applied to a current block.

A sub-block-based temporal merge candidate of a current block may be derived on the basis of at least one of upper-left position information (xCb, yCb) on a luma component of the current block, a width and a height of the current block, information (usableFlagA0, usableFlagA1, usableFlagB0, usableFlagB1) on whether or not a neighbor block of the current block is usable, reference picture index information (refIdxLXA0, refIdxLXA1, refIdxLXB0, refIdxLXB), a prediction direction indicator (predFlagLXA0, predFlagLXA1, predFlagLXB0, predFlagLXB), and a motion vector (mvLXA0, mvLXA1, mvLXB0, mvLXB1).

By the above deriving of the sub-block-based temporal merge candidate, whether or not a sub-block-based temporal merge candidate is usable (usableFlagSbCol), the number of sub-blocks in a horizontal direction (numSbX), the number of sub-blocks in a vertical direction (numSbY), an reference picture index (refIdxLXSbCol) of the sub-block-based temporal merge candidate, a motion vector (mvLXSbCol[xSbIdx][ySbIdx]) for each sub-block, and a prediction direction indicator (predFlagLXSbCol[xSbIdx][ySbIdx]) may be derived. Herein, xSbIdx=0 . . . numSbX−1, ySbIdx=0 . . . numSbY−1, and X may have a value of 0 or 1.

In some examples of the present invention, a merge type between a sub-block-base partitioned motion information merge candidate, a sub-block-base non-partitioned merge candidate, and/or affine merge candidates may be respectively differently defined. Herein, information on a merge candidate type indicating a merge type of a current block may be defined.

In an example, information on a merge candidate type may have 0 that is a first value, 1 that is a second value, and 2 that is a third value. Herein, detailed values of the first value, the second value, and the third value are not limited thereto, and the above may be applied to the example below. For example, a merge type according to a value of information on a merge candidate type may be as in the example below.

Merge type 0: sub-block-base partitioned translational motion model merge candidate Merge type 1: sub-block-base non-partitioned translational motion model merge candidate Merge type 2: affine merge candidate Herein, motion compensation different from each other may be performed on a current block on the basis of information on a merge candidate type, and information on an affine transform indicator indicating whether or not to apply affine transform apply (for example, affine flag).

An affine transform indicator may indicate whether or not to apply affine transform model (4-parameter, 6-parameter) to a current block, and whether or not to partition the current block into sub-blocks. In an example, when an affine transform indicator indicates 1 that is a first value, the affine transform indicator may indicate that an affine transform model and/or sub-block-based partition is applied to a current block. However, when an affine transform indicator indicates 0 that is a first value, the affine transform indicator may indicate that an affine transform model is not applied to a current block. Herein, detailed values of the first value, and the second value are not limited thereto, and the above may be applied to the example below.

In an example, when information on a merge candidate type of a current block is a first value, and an affine transform indicator value is a second value, motion compensation, to which a sub-block-base non-partitioned translational motion model is applied, may be performed on a current block.

In another example, when information on a merge candidate type of a current block is a second value, and affine transform indicator value is a first value, sub-block-based motion compensation may be performed by partitioning the current block into sub-blocks.

In another example, when information on a merge candidate type of a current block is a third value, and an affine transform indicator value is a first value, 2 or 3 CPMVs may be derived for the current block according to an affine transform model (4-parameter or 6-parameter). Subsequently, motion information on each sub-block of an N×M size may be derived by using derived CPMVs. (N and M mean a natural number greater than 0, and may have the same or different values.)

In another example, a sub-block-base non-partitioned translational motion model merge candidate and an affine merge candidate may have the same merge type. For example, information on a merge candidate type may have 0 that is a first value or 1 that is a second value. Herein, detailed values of the first value and the second value are not limited to the above example. In an example, a merge type according to a value of information on a merge candidate type may be as the example below.

Merge type 0: a sub-block-base non-partitioned translational motion model merge, or an affine merge mode Merge type 1: sub-block-base partitioned translational motion model merge candidate A block that is not partitioned into sub-blocks among neighbor blocks adjacent to a current block may not be used as an affine transform model-based affine merge candidate. For example, a neighbor block with an affine transform indicator indicating a first value, and a merge type being a second value may not be used as an affine merge candidate for deriving a CPMV of a current block.

A motion model indicator (for example, MotionModelIdc) indicating one of a sub-block-base partitioned motion information merge candidate, a sub-block-base non-partitioned merge candidate, and an affine merge candidate may be defined by using information on a coding parameter. Herein, information on a coding parameter may mean at least one of information on a flag (for example, affine flag) indicating whether or not to apply affine transform and/or whether or not to perform sub-block-based partitioning, and information on a merge candidate type or/and information on a transform model (4-parameter or 6-parameter).

In an example, when a flag value indicating whether or not to apply affine transform and/or whether or not to perform sub-block-based partitioning is a first value, a current block may be partitioned into sub-blocks, and sub-block-based motion information (for example, ATMVP), and an affine transform model of a 4-parameter or 6-parameter may be applied to the current block.

In another example, when a value of a flag indicating whether or not to apply affine transform and/or whether or not to perform sub-block-based partitioning is a second value, a current block may be encoded/decoded without being partitioned into sub-blocks.

In an example, when a value of an affine indicator (affine flag) of a current block is a second value, a motion model indicator value of the current block may be a first value.

In another example, when a value of an affine indicator (affine flag) of a current block is 1 that is a first value, and information on a merge candidate type is a second value (merge type being a sub-block-base partitioned merge candidate), a motion model indicator value of the current block may be a second value.

In another example, when a value of an affine indicator (affine flag) of a current block is a first value, information on a merge candidate type is a third value (affine merge candidate), and a transform model (affine_type) of the current block is a 4-parameter, a motion model indicator value of the current block may be a third value.

In another example, when a value of an affine indicator (affine flag) of a current block is a first value, information on a merge candidate type is a third value (affine merge candidate), and a transform model (affine_type) of a current block is a 6-parameter, a motion model indicator value of the current block may be a fourth value.

In other words, following types of motion information may be indicated according to the motion model indicator value.

MotionModelIdc 0: a sub-block-base non-partitioned translational motion model

MotionModelIdc 1: a sub-block-base derived translational motion model

MotionModelIdc 2:4-parameter transform model

MotionModelIdc 3:6-parameter transform model

A value associated with the motion model indicator is not limited to the above example.

A 4-parameter transform model may mean an affine mode using two CPMVs (control point motion vector), and a 6-parameter transform model may mean an affine mode using three CPMVs.

The encoder or decoder may perform motion compensation different from each other according to a motion model indicator value.

In an example, when a motion model indicator value of a current block is a first value, motion compensation to which a sub-block-base non-partitioned translational motion model is applied may be performed on the current block.

In another example, when a motion model indicator value of a current block is a second value, motion compensation according to sub-block-base derived motion information of the current block may be performed.

In another example, when a motion model indicator value of a current block is a third value or fourth value, two or three CPMVs may be derived for the current block. Subsequently, motion information on each sub-block may be derived by using the derived CPMVs, and motion compensation may be performed by using the derived motion information.

In some example of the present invention, a merge type may be defined as a default merge type and a sub-block-based partitioned merge type.

In an example, information on a merge candidate type may have 0 that is a first value, 1 that is a second value, or 2 that is a third value. Herein, detailed values of the first value, and the second value are not limited thereto, and the above may be applied to the example below. For example, a merge type according to a value of information on a merge candidate type may be as the following example.

Merge type 0: a default merge candidate

Merge type 1: a sub-block-based partitioned merge candidate

Herein, motion compensation different from each other may be performed on a current block on the basis of information on a merge candidate type, and information on an affine transform indicator indicating whether or not to apply affine transform (for example, affine flag).

In an example, when information on a merge candidate type of a current block is a first value, and an affine transform indicator value is a second value, motion compensation to which a sub-block-based non-partitioned translational motion model is applied may be performed on the current block.

In another example, when information on a merge candidate type of a current block is a second value, and affine transform indicator value is a first value, sub-block-based motion compensation may be performed by partitioning the current block into sub-blocks.

In another example, when information on a merge candidate type of a current block is a first value, and an affine transform indicator value is a first value, two or three CPMVs may be derived for the current block according to an affine transform model (4-parameter or 6-parameter). Subsequently, motion information on each sub-block of an N×M size may be derived by using derived CPMVs. (N and M mean a natural number greater than 0, and may have the same or different values.)

As above, when a merge type is defined as a default merge type and a sub-block-based partitioned merge type, a model indicator (MotionModelIdc) indicating one of a sub-block-base partitioned motion information merge candidate, a sub-block-base non-partitioned merge candidate, and an affine merge candidate may be defined as below.

In an example, when a value of an affine indicator (affine flag) of a current block is a second value, a motion model indicator value of the current block may be a first value.

In another example, when a value of an affine indicator (affine flag) of a current block is 1 that is a first value, and a merge candidate type is a second value (merge type being a sub-block-base partitioned merge candidate), a motion model indicator value of the current block may be a second value.

In another example, when a value of an affine indicator (affine flag) of a current block is a first value, information on a merge candidate type is a first value (default merge candidate), and a transform model (affine_type) of the current block is a 4-parameter, a motion model indicator value of the current block may be a third value.

In another example, when a value of an affine indicator (affine flag) of a current block is a first value, information on a merge candidate type is a third value (affine merge candidate), and a transform model (affine_type) of a current block is a 6-parameter, a motion model indicator value of the current block may be a fourth value.

In other words, following types of motion information may be indicated according to the motion model indicator value.

MotionModelIdc 0: a sub-block-based non-partitioned translational motion model

MotionModelIdc 1: a sub-block-base derived translational motion model

MotionModelIdc 2: a 4-parameter transform model

MotionModelIdc 3: a 6-parameter transform model

A value associated with the motion model indicator is not limited to the above example.

Hereinafter, a method of determining a merge candidate according to an embodiment of the present invention will be described.

The encoder may determine a merge candidate within a merge candidate list, encode a merge candidate index (merge_idx) into a bitstream, and perform motion estimation and motion compensation by using motion information of the determined merge candidate.

For example, when 3 is selected as a merge candidate index, a merge candidate indicated by the merge candidate index of 3 within the merge candidate list may be determined as motion information, and used for motion estimation and motion compensation of an encoding target block.

The decoder may decode a merge candidate index within a bitstream, and determine a merge candidate within merge candidate list indicated by the merge candidate index. The determined merge candidate may be determined as motion information of a decoding target block. The determined motion information may be used for motion compensation of the decoding target block. Herein, motion compensation may be the same as the meaning of inter-prediction.

For example, when a merge candidate index is 2, a merge candidate indicated by the merge candidate index of 2 within a merge candidate list may be determine for motion information, and used for motion compensation of the decoding target block.

Hereinafter, a method of performing motion compensation according to an embodiment of the present invention will be described.

The encoder and the decoder may perform inter-prediction or motion compensation by using a determined merge candidate. Herein, an encoding/decoding target block may include motion information of the determined merge candidate.

When an encoding/decoding target block includes at least one or up to N motion vectors/information, the encoder and the decoder may generate at least one or up to N prediction blocks by using the at least one or up to N motion vectors/information among the corresponding motion vectors/information, and use as a final prediction block of the encoding/decoding target block In an example, when an encoding/decoding target block includes one motion vector/information, the encoder and the decoder may generate a prediction block by using the corresponding motion vector/information, and use the generated prediction block as a final prediction block of the encoding/decoding target block.

In another example, when an encoding/decoding target block includes two motion vectors/information, the encoder and the decoder may generate prediction blocks by using two motion vectors/information, and derive a prediction block by a weighted sum of prediction blocks so as to use as a final prediction block of the encoding/decoding target block. Herein, a weighting factor applied to each prediction block may be ½.

In another example, when an encoding/decoding target block includes three motion vectors/information, the encoder and the decoder may generate prediction blocks by using three motion vectors/information, and derive a prediction block by a weighted sum of three prediction blocks so as to use as a final prediction block of the encoding/decoding target block. Herein, a weighting factor applied to each prediction block may be ⅓.

In another example, when an encoding/decoding target block includes four motion vectors/information, the encoder and the decoder may generate prediction blocks by using four motion vectors/information, and derive a prediction block by a weighted sum of four prediction blocks so as to use as a final prediction block of the encoding/decoding target block. Herein, a weighting factor applied to each prediction block may be ¼.

The above-described weighting factor is not limited to a fixed value, and may be a variable value. A weighting factor applied to each prediction block may be identical or different from each other. In order to apply a variable weighting factor, at least one piece of weighting factor information may be signaled for the decoding target block through a bitstream. Weighting factor information may be signaled for each prediction block, or may be signaled for each reference picture. A plurality of prediction blocks may share one piece of weighting factor information.

When a prediction block list utilization flag is a first value, an encoding/decoding target block may use the corresponding motion information. In addition, when a prediction block list utilization flag is a second value, an encoding/decoding target block may not use the corresponding motion information In an example, when an encoding/decoding target block possibly uses two pieces of motion information or when an inter-prediction indicator is PRED_BI, a weighted sum of prediction blocks may be calculated according to Equation 9 below.

$$P\_BI = (WF\_L0 * P\_L0 + OFFSET\_LO + WF\_L1 * P\_L1 + OFFSET\_L1 + RF) \gg 1 \quad \text{[Equation 9]}$$

In an example, when an encoding/decoding target block possibly uses three pieces of motion information or when an inter-prediction indicator is PRED_TRI, a weighted sum of prediction blocks may be calculated according to Equation 10 below.

$$P\_TRI = (WF\_L0 * P\_L0 + OFFSET\_LO + WF\_L1 * P\_L1 + OFFSET\_L1 + WF\_L2 * P\_L2 + OFFSET\_L2 + RF)/3 \quad \text{[Equation 10]}$$

In an example, when an encoding/decoding target block possibly uses four pieces of motion information or when an inter-prediction indicator is PRED_QUAD, a weighted sum of prediction blocks may be calculated according to Equation 11 below.

$$P\_QUAD = (WF\_L0 * P\_L0 + OFFSET\_LO + WF\_L1 * P\_L1 + OFFSET\_L1 + WF\_L2 * P\_L2 + OFFSET\_L2 + WF\_L3 * P\_L3 + OFFSET\_L3 + RF) \gg 2$$

In the above equations, each of P_BI, P_TRI, and P_QUAD may be a final prediction block of the encoding/decoding target block, each of WF_L0, WF_L1, WF_L2, and WF_L3 may be a weighting factor value for each prediction block, each of OFFSET_L0, OFFSET_L1, OFFSET_L2, and OFFSET_L3 may be an offset value for each prediction block, and P_L0, P_L1, P_L2, and P_L3 may mean prediction blocks respectively generated by using L0 to L3 motion vectors/information of the encoding/decoding target block. RF may mean a rounding factor, and have a positive or negative integer value including 0. In addition, L0 may mean a reference picture list 0, L1 may mean a reference picture list 1, L2 may mean a reference picture list 2, and L3 may mean a reference picture list 3.

Herein, at least one of an L2 reference picture list and an L3 reference picture list may include at least one of a long-term reference picture, a reference picture on which deblocking filter is not performed, a reference picture on which sample adaptive offset is not performed, a reference picture on which adaptive loop filter is not performed, a reference picture on which deblocking filter and sample adaptive offset are only performed, a reference picture on which deblocking filter and adaptive offset are only performed, and a reference picture on which sample adaptive offset and adaptive offset are only performed.

When an encoding/decoding target block includes at least two motion vectors/information, the encoder and the decoder may generate prediction blocks by using two motion vectors/information, and calculate a weighted sum of the prediction blocks. When calculating a weighted sum of prediction blocks, at least one of a weighting factor and an offset for each prediction block which is used for calculating a weighted sum may be used by entropy encoding/decoding.

In addition, the encoder and the decoder may not entropy encode/decode at least one of weighting factor information and offset information, and use at least one of encoded/decoded weighting factor and offset values of a neighbor block as at least one of a weighting factor and an offset for each prediction block.

In addition, the encoder and the decoder may not entropy encode/decode at least one of weighting factor information and offset information, and calculate the same on the basis of a current image to which an encoding/decoding target block belongs, and a POC of each reference picture. The encoder and the decoder may use at least one of a small weighting factor value and a small offset when a distance between a current image and a reference picture becomes large, and use at least one of a large weighting factor value and a large offset value when a distance between a current image and a reference picture becomes small. For example, the encoder and the decoder may calculate a weighting factor value as ⅓ when a POC difference between a current image and an L0 reference picture is 2, and calculate a weighting factor value as ⅔ when a POC difference between a current image and an L0 reference picture is 1. In other words, the encoder and the decoder may calculate a weighting factor value for each prediction block in inverse proportion to the POC difference.

In addition, the encoder and the decoder may entropy encode/decode at least one of weighting factor information and offset information on the basis of at least one coding parameter. In addition, the encoder and the decoder may calculate a weighted sum of prediction blocks on the basis of at least one coding parameter.

The weighted sum of prediction blocks may be applied to a partial region within the prediction block. For example, a partial region may be a region corresponding to a boundary of the prediction block. In addition, a weighted sum of prediction blocks may be calculated on the basis of a sub-block.

In addition, in calculating a weighted sum of prediction blocks by using motion vector prediction, the encoder and the decoder may calculate a weighted sum by using at least one motion vector candidate present within a motion vector candidate list, and use the calculated weighted sum as a final prediction block of an encoding/decoding target block.

In an example, the encoder and the decoder may generate prediction blocks by only using spatial motion vector candidates, and calculate a weighted sum of the prediction blocks. The encoder and the decoder may use the calculated weighted sum as a final prediction block of the encoding/decoding target block.

In another example, the encoder and the decoder may generate prediction blocks by using a spatial motion vector candidate and temporal motion vector candidates, and calculate a weighted sum of the prediction blocks. The encoder and the decoder may use the calculated weighted sum as a final prediction block of the encoding/decoding target block.

In another example, the encoder and the decoder may generate prediction blocks by only using combined motion vector candidates, and calculate a weighted sum of the prediction blocks. The encoder and the decoder may use the calculated weighted sum as a final prediction block of the encoding/decoding target block.

In another example, the encoder and the decoder may generate prediction blocks by only using motion vector candidates within specific motion vector candidate indices, and calculate a weighted sum of the prediction blocks. The encoder and the decoder may use the calculated weighted sum as a final prediction block of the encoding/decoding target block.

In another example, the encoder and the decoder may generate prediction blocks by only using motion vector candidates present within a range of a specific motion vector candidate index, and calculate a weighted sum of the prediction blocks. The calculated weighted sum may be used as a final prediction block of the encoding/decoding target block In addition, in calculating a weighted sum of prediction blocks by using a merge mode, the encoder and the decoder may calculate a weighted sum by using at least one merge candidate present in a merge candidate list, and use the calculated weighted sum as a final prediction block of an encoding/decoding target block.

In an example, the encoder and the decoder may generate prediction blocks by only using spatial merge candidates, and calculate a weighted sum of the prediction blocks. The encoder and the decoder may use the calculated weighted sum as a final prediction block of the encoding/decoding target block.

In another example, the encoder and the decoder may generate prediction blocks by using a spatial merge candidate and temporal merge candidates, and calculate a weighted sum of the prediction blocks. The encoder and the decoder may use the calculated weighted sum as a final prediction block of the encoding/decoding target block.

In another example, the encoder and the decoder may generate prediction blocks by only using combined merge candidates, and calculate a weighted sum of the prediction blocks. The encoder and the decoder may use the calculated weighted sum as a final prediction block of the encoding/decoding target block.

In another example, the encoder and the decoder may generate prediction blocks by only using merge candidates within specific merge candidate indices, and calculate a weighted sum of the prediction blocks. The encoder and the decoder may use the calculated weighted sum as a final prediction block of the encoding/decoding target block.

In another example, the encoder and the decoder may generate prediction blocks by only using merge candidates present within a range of a specific merge candidate index, and calculate a weighted sum of the prediction blocks. The encoder and the decoder may use the calculated weighted sum as a final prediction block of the encoding/decoding target block.

When at least one piece of information on motion compensation is entropy encoded/decoded, at least one of a truncated rice binarization method, a K-th order exp_Golomb binarization method, a restricted K-th order exp_Golomb binarization method, a fixed-length binarization method, a unary binarization method, and a truncated unary binarization method may be used.

When at least one piece of information on motion compensation is entropy encoded/decoded, a context model may be determined by using at least one piece of information on motion compensation of a neighbor block, at least one piece of information on motion compensation that is previously encoded/decoded, information on a current unit/block depth, or information on a current unit/block size.

When at least one piece of information on motion compensation is entropy encoded/decoded, at least one piece of information on motion compensation of a neighbor block, at least one piece of information on motion compensation that is previously encoded/decoded, information on a current unit/block depth, or information on a current unit/block size may be used as information on a prediction value for motion compensation of a current block.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 16×16 or greater. For example, the above embodiments may be applied when a size of current block is 32×32 or greater. For example, the above embodiments may be applied when a size of current block is 64×64 or greater. For example, the above embodiments may be applied when a size of current block is 128×128 or greater. For example, the above embodiments may be applied when a size of current block is 4×4. For example, the above embodiments may be applied when a size of current block is 8×8 or smaller. For example, the above embodiments may be applied when a size of current block is 16×16 or smaller. For example, the above embodiments may be applied when a size of current block is equal to or greater than 8×8 and equal to or smaller than 16×16. For example, the above embodiments may be applied when a size of current block is equal to or greater than 16×16 and equal to or smaller than 64×64. The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

As in the above embodiment of the present invention, the reference picture set used in the process of reference picture list construction and reference picture list modification is at least one of reference picture list among L0, L1, L2, and L3.

According to the embodiment of the present invention, when calculating a boundary strength in the deblocking filter, one to up to N motion vectors of an encoding/decoding target block may be used. Where N may be a positive integer of 1 or more, and may be 2, 3, 4, or the like.

The above embodiments may be applied when a motion vector in motion vector prediction is in one of the 16-pel units, 8-pel units, 4-pel units, integer-pel units, ½-pel units, ¼-pel units, ⅛-pel units, 1/16-pel units, 1/32-pel units and 1/64-pel units. In addition, when performing motion vector prediction, a motion vector may be selectively used for each pixel unit.

A slice type or a tile group type to which the above embodiments of the present invention are applied may be defined, and the above embodiments may be applied depending on the corresponding slice type or tile group type.

For example, when the slice type is tri-predictive-slice, a prediction block is generated using at least three motion vectors, and the prediction block generated by calculating the weighted sum of at least three prediction blocks may be used as the final prediction block of the encoding/decoding target block. For example, when the slice type is quad-predictive-slice, a prediction block is generated using at least four motion vectors, and the prediction block generated by calculating the weighted sum of at least four prediction blocks may be used as the final prediction block of the encoding/decoding target block.

The above embodiments of the present invention may be applied not only to inter prediction and motion compensation methods using motion vector prediction, but also to inter prediction and motion compensation methods using skip mode and merge mode.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
   - determining whether a sub-block merge mode is applied to a current block or not;
   - in response that the sub-block merge mode being applied to the current block, deriving a temporal motion vector of the current block;
   - determining, based on the temporal motion vector of the current block, a position of a co-located block within a co-located picture, the position of the co-located block being determined based on a central position of the current block; and
   - determining a representative motion vector based on motion information of the co-located block,
   - wherein, based on whether the motion information of the co-located block is available or not, an availability of whether a motion vector of the current block is derived in units of sub-blocks is determined,
   - wherein, in response to deriving the motion vector of the current block in units of sub-blocks being available, a sub-block motion vector of the sub-block included in the current block is derived based on a co-located sub-block corresponding to the sub-block, and
   - wherein, in response to motion information of the co-located sub-block corresponding to the sub-block being unavailable, the sub-block motion vector of the sub-block is determined as the representative motion vector.

2. The method of claim 1, wherein the temporal motion vector is derived from a neighboring block covering a pre-defined position.

3. The method of claim 2, wherein the pre-defined position represents a left neighboring position adjacent to the current block.

4. The method of claim 2, wherein when the motion vector of the neighboring block is unavailable, a zero motion vector is used as the temporal motion vector.

5. The method of claim 2, wherein in response to a reference picture of the neighboring block being identical to the co-located picture, the temporal motion vector is derived same as the motion vector of the neighboring block.

6. The method of claim 1, wherein the position of the co-located block is determined by adding the temporal motion vector to the central position of the current block.

7. The method of claim 1, wherein when a prediction mode of the co-located block is one of an intra-prediction mode and a prediction mode referring to a picture in which the co-located block is included, the motion information of the co-located block is unavailable.

8. The method of claim 1, wherein a width and a height of the sub-block are predetermined.

9. The method of claim 1, wherein the availability of whether the motion vector of the current block is derived in units of sub-blocks is determined further based on a size of the current block.

10. The method of claim 9, wherein when a width of the current block is smaller than 8 or a height of the current block is smaller than 8, deriving the motion vector of the current block in units of sub-blocks is unavailable.

11. A method of encoding an image, wherein the method comprising:
   - deriving a temporal motion vector of a current block;
   - determining, based on the temporal motion vector of the current block, a position of a co-located block within a co-located picture, the position of the co-located block being determined based on a central position of the current block; and
   - determining a representative motion vector based on motion information of the co-located block,
   - wherein, based on whether the representative motion information of the co-located block is available or not, an availability of whether a motion vector of the current block is derived in units of sub-blocks is determined,
   - wherein, in response to deriving the motion vector of the current block in units of sub-blocks being available, a sub-block motion vector of the sub-block included in the current block is derived based on a co-located sub-block corresponding to the sub-block, and
   - wherein, in response to motion information of the co-located sub-block corresponding to the sub-block being unavailable, the sub-block motion vector of the sub-block is determined as the representative motion vector.

12. A method of transmitting compressed video data, the method comprising:
   - generating the compressed video data; and
   - transmitting the compressed video data,
   - wherein generating the compressed video data comprises:
   - deriving a temporal motion vector of a current block,
   - determining, based on the temporal motion vector of the current block, a position of a co-located block within a co-located picture, the position of the co-located block being determined based on a central position of the current block, and
   - determining a representative motion vector based on motion information of the co-located block,
   - wherein, based on whether the representative motion information of the co-located block is available or not, an availability of whether a motion vector of the current block is derived in units of sub-blocks is determined, wherein, in response to deriving the motion vector of the current block in units of sub-blocks being available, a sub-block motion vector of the sub-block included in the current block is derived based on a co-located sub-block corresponding to the sub-block, and wherein, in response to motion information of the co-located sub-block corresponding to the sub-block being unavailable, the sub-block motion vector of the sub-block is determined as the representative motion vector.

* * * * *